(12) United States Patent
Grzeskowiak, II et al.

(10) Patent No.: US 12,459,864 B2
(45) Date of Patent: Nov. 4, 2025

(54) METALLIC STONE SLABS, SYSTEMS, AND METHODS

(71) Applicant: Cambria Company LLC, Eden Prairie, MN (US)

(72) Inventors: Jon Louis Grzeskowiak, II, Prior Lake, MN (US); Martin E. Davis, Excelsior, MN (US); Michael Raymond Mead, Elysian, MN (US)

(73) Assignee: Cambria Company LLC, Eden Prairie, MN (US)

( * ) Notice: Subject to any disclaimer, the term of this patent is extended or adjusted under 35 U.S.C. 154(b) by 336 days.

(21) Appl. No.: 17/744,466

(22) Filed: May 13, 2022

(65) Prior Publication Data

US 2022/0363600 A1 Nov. 17, 2022

Related U.S. Application Data

(60) Provisional application No. 63/306,876, filed on Feb. 4, 2022, provisional application No. 63/188,403, filed on May 13, 2021.

(51) Int. Cl.
| | | |
|---|---|---|
| B32B 3/10 | (2006.01) |
| C04B 14/34 | (2006.01) |
| C04B 26/10 | (2006.01) |
| C04B 40/00 | (2006.01) |
| C04B 41/45 | (2006.01) |
| C04B 41/53 | (2006.01) |
| C04B 111/00 | (2006.01) |

(52) U.S. Cl.
CPC .............. *C04B 14/34* (2013.01); *C04B 26/10* (2013.01); *C04B 40/0067* (2013.01); *C04B 41/457* (2013.01); *C04B 41/53* (2013.01); *C04B 2111/00525* (2013.01); *C04B 2111/00905* (2013.01)

(58) Field of Classification Search
None
See application file for complete search history.

(56) References Cited

U.S. PATENT DOCUMENTS

| | | |
|---|---|---|
| 178,308 A | 6/1876 | Leathers et al. |
| 1,212,331 A | 1/1917 | Denivelle |
| 1,474,817 A | 11/1923 | Fincke |
| 1,485,810 A | 3/1924 | Parker, Jr. et al. |

(Continued)

FOREIGN PATENT DOCUMENTS

| | | |
|---|---|---|
| CA | 2896383 | 7/2017 |
| CH | 190667 | 7/1937 |

(Continued)

OTHER PUBLICATIONS

Machine translation of JP-2002285006-A.*

(Continued)

*Primary Examiner* — Christopher M Polley
(74) *Attorney, Agent, or Firm* — Fish & Richardson P.C.

(57) ABSTRACT

Stone slabs, and systems and methods of forming slabs, are described. Some example slabs include a first pattern defined by a first particulate mineral mix and a second pattern defined by a second particulate mineral mix different from the first particulate mineral mix. The first particulate mix includes greater than 50 weight percent of first metallic particles.

18 Claims, 10 Drawing Sheets

(56) References Cited

U.S. PATENT DOCUMENTS

| | | |
|---|---|---|
| 1,568,070 A | 1/1926 | Jennens |
| 1,570,538 A | 1/1926 | Thomas |
| 1,711,701 A | 5/1929 | Speck |
| 1,939,045 A | 12/1933 | Fredriksen |
| D92,186 S | 5/1934 | Little |
| 2,280,488 A | 4/1942 | Jenkins et al. |
| 2,474,654 A | 6/1949 | Carlson |
| 2,556,486 A | 6/1951 | Smith |
| 3,013,370 A | 12/1961 | Vida |
| 3,088,713 A | 5/1963 | Gard |
| 3,164,647 A | 1/1965 | Fischler |
| 3,177,279 A | 4/1965 | Bilodeau |
| 3,245,129 A | 4/1966 | Entz |
| 3,245,648 A | 4/1966 | Johansson et al. |
| 3,255,024 A | 6/1966 | Alexander et al. |
| 3,318,984 A | 5/1967 | Dussel |
| 3,578,276 A | 5/1971 | Soderlund |
| 3,628,766 A | 12/1971 | Hartmann |
| 3,670,060 A | 6/1972 | Cuffaro et al. |
| 3,712,825 A | 1/1973 | Yocum |
| 3,743,235 A | 7/1973 | Shelley |
| 3,819,436 A | 6/1974 | Allen |
| 3,843,089 A | 10/1974 | Scholz et al. |
| 3,870,777 A | 3/1975 | Jakel |
| 3,904,791 A | 9/1975 | Iverson et al. |
| 3,990,212 A | 11/1976 | Flodin |
| 4,092,199 A | 5/1978 | Ungar et al. |
| 4,094,941 A | 6/1978 | Manners et al. |
| 4,204,820 A | 5/1980 | Toncelli |
| 4,254,077 A | 3/1981 | Fontana et al. |
| 4,388,975 A | 6/1983 | Hirano |
| 4,421,466 A | 12/1983 | Heitzman |
| 4,466,500 A | 8/1984 | Mosher et al. |
| 4,484,645 A | 11/1984 | Inoue |
| 4,680,155 A | 7/1987 | Rochefort et al. |
| 4,698,010 A | 10/1987 | Toncelli |
| 4,914,870 A | 4/1990 | Toncelli |
| 5,022,193 A | 6/1991 | Toncelli |
| 5,069,939 A | 12/1991 | McKinnon |
| 5,080,085 A | 1/1992 | Lovato |
| 5,266,253 A | 11/1993 | Dijkhuizen et al. |
| 5,445,772 A | 8/1995 | Uchida |
| 5,662,847 A | 9/1997 | Uchida et al. |
| 5,664,305 A | 9/1997 | Lawton et al. |
| 5,670,007 A | 9/1997 | Toncelli |
| 5,679,298 A | 10/1997 | Uchida et al. |
| 5,795,513 A | 8/1998 | Austin |
| 5,813,183 A | 9/1998 | Attley |
| 5,885,503 A | 3/1999 | Bordener |
| 5,976,642 A | 11/1999 | Yang |
| 6,080,234 A | 6/2000 | Bernard et al. |
| D428,590 S | 7/2000 | Lagaay |
| 6,103,160 A | 8/2000 | Uchida |
| 6,205,727 B1 | 3/2001 | Toncelli |
| 6,228,463 B1 | 5/2001 | Chen et al. |
| 6,237,294 B1 | 5/2001 | Rygiel |
| 6,461,552 B1 | 10/2002 | Geiger |
| 6,517,915 B1 | 2/2003 | Banus |
| 6,572,802 B1 | 6/2003 | Austin |
| D491,372 S | 6/2004 | Dugas et al. |
| 6,773,641 B1 | 8/2004 | Toncelli |
| 7,140,869 B2 | 11/2006 | Toncelli |
| D602,258 S | 10/2009 | Simione et al. |
| 7,771,680 B2 | 8/2010 | Gordienko |
| D623,319 S | 9/2010 | Martin |
| 7,815,827 B2 | 10/2010 | Cruz |
| 7,984,600 B2 | 7/2011 | Alford et al. |
| 8,030,441 B2 | 10/2011 | Toncelli |
| 8,101,113 B2 | 1/2012 | Castonguay et al. |
| 8,158,548 B2 | 4/2012 | Di Noto et al. |
| 8,333,916 B2 | 12/2012 | Jamrussamee et al. |
| D677,955 S | 3/2013 | Bender et al. |
| D678,556 S | 3/2013 | Metcalf |
| 8,398,954 B2 | 3/2013 | Gordienko |
| D682,557 S | 5/2013 | Lee |
| 8,436,075 B2 | 5/2013 | Buskila et al. |
| 8,636,941 B1 | 1/2014 | Ciuperca |
| 8,702,886 B2 | 4/2014 | Yaniv et al. |
| D705,954 S | 5/2014 | Choi et al. |
| D705,955 S | 5/2014 | Choi et al. |
| D714,559 S | 10/2014 | Mccuaig |
| D715,563 S | 10/2014 | Zeamer |
| 8,940,223 B2 | 1/2015 | Toncelli |
| 8,980,770 B2 | 3/2015 | Cawse et al. |
| D731,086 S | 6/2015 | Martin et al. |
| 9,073,239 B2 | 7/2015 | Banus |
| 9,085,090 B2 | 7/2015 | Toncelli |
| 9,186,819 B1 | 11/2015 | Grzeskowiak, II et al. |
| D746,064 S | 12/2015 | Zeamer |
| D746,066 S | 12/2015 | Mccuaig |
| 9,260,344 B1 | 2/2016 | Zhao |
| 9,289,923 B1 | 3/2016 | Grzeskowiak, II et al. |
| 9,427,896 B1 | 8/2016 | Xie |
| 9,469,990 B2 | 10/2016 | Dirkson |
| 9,511,516 B2 | 12/2016 | Xie |
| D776,299 S | 1/2017 | Clevenger |
| 9,671,274 B1 | 6/2017 | Xie |
| 9,707,698 B1 | 7/2017 | Xie |
| 9,718,303 B2 | 8/2017 | Grzeskowiak et al. |
| 9,993,942 B2 | 6/2018 | Grzeskowiak, II et al. |
| 10,300,626 B2 | 5/2019 | Grzeskowiak et al. |
| 10,569,506 B2 | 2/2020 | Jin et al. |
| 10,773,418 B2 | 9/2020 | Grzeskowiak et al. |
| 2002/0081388 A1 | 6/2002 | Batliner et al. |
| 2004/0032044 A1 | 2/2004 | Toncelli |
| 2004/0175514 A1 | 9/2004 | Stiattest |
| 2005/0013991 A1 | 1/2005 | Yang |
| 2005/0055931 A1 | 3/2005 | Rochette |
| 2006/0101752 A1 | 5/2006 | Sakai et al. |
| 2006/0193693 A1 | 8/2006 | Congdon |
| 2007/0057408 A1 | 3/2007 | Sandqvist et al. |
| 2007/0216058 A1 | 9/2007 | Carreras-Maldonado et al. |
| 2007/0248836 A1 | 10/2007 | Linde |
| 2008/0113123 A1 | 5/2008 | Izzo |
| 2008/0138595 A1 | 6/2008 | Bordener |
| 2008/0153688 A1 | 6/2008 | Borens et al. |
| 2008/0296795 A1 | 12/2008 | Willis-Papi |
| 2008/0315448 A1 | 12/2008 | Cruz |
| 2009/0047503 A1 | 2/2009 | Godi et al. |
| 2009/0105391 A1 | 4/2009 | Buskila et al. |
| 2009/0274909 A1 | 11/2009 | Bergevin et al. |
| 2010/0048772 A1 | 2/2010 | Moore |
| 2010/0159220 A1 | 6/2010 | Toncelli |
| 2010/0194005 A1 | 8/2010 | Toncelli |
| 2011/0034586 A1 | 2/2011 | Buskila et al. |
| 2011/0104451 A1 | 5/2011 | Yaniv et al. |
| 2011/0166696 A1 | 7/2011 | Nigon |
| 2011/0283859 A1 | 11/2011 | Codemo |
| 2012/0003453 A1 | 1/2012 | Buskila et al. |
| 2012/0153526 A1 | 6/2012 | Ko et al. |
| 2012/0183735 A1 | 7/2012 | Moreno et al. |
| 2012/0283384 A1 | 11/2012 | Cox |
| 2013/0130036 A1 | 5/2013 | Bettiol et al. |
| 2013/0137810 A1 | 5/2013 | Shin |
| 2013/0196251 A1 | 8/2013 | Di Noto et al. |
| 2013/0341254 A1 | 12/2013 | Bauer |
| 2014/0141961 A1 | 5/2014 | Koszo |
| 2015/0064315 A1 | 3/2015 | van Blokland |
| 2015/0136311 A1 | 5/2015 | Mjelde |
| 2015/0314475 A1 | 11/2015 | Banus |
| 2015/0360507 A1 | 12/2015 | Benito |
| 2016/0052164 A1 | 2/2016 | Grzeskowiak, II et al. |
| 2016/0052333 A1 | 2/2016 | Grzeskowiak, II et al. |
| 2016/0052334 A1 | 2/2016 | Grzeskowiak, II et al. |
| 2016/0089818 A1 | 3/2016 | Xie |
| 2016/0290852 A1 | 10/2016 | Chandler et al. |
| 2017/0210041 A1 | 7/2017 | Toncelli |
| 2018/0126673 A1 | 5/2018 | Sanchis Brines |
| 2018/0290333 A1 | 10/2018 | Grzeskowiak et al. |
| 2019/0105800 A1 | 4/2019 | Xie |
| 2019/0283270 A1 | 9/2019 | Grzeskowiak, II |

(56) References Cited

U.S. PATENT DOCUMENTS

| | | |
|---|---|---|
| 2020/0047372 A1 | 2/2020 | Chung |
| 2021/0308975 A1 | 10/2021 | Grzeskowiak et al. |

FOREIGN PATENT DOCUMENTS

| | | | | |
|---|---|---|---|---|
| CN | 1153751 | | 7/1997 | |
| CN | 1184039 | | 6/1998 | |
| CN | 1718403 | | 1/2006 | |
| CN | 1301199 | | 2/2007 | |
| CN | 1931545 | | 3/2007 | |
| CN | 1966229 | | 5/2007 | |
| CN | 100463788 | | 2/2009 | |
| CN | 101486217 | | 7/2009 | |
| CN | 101564868 | | 10/2009 | |
| CN | 101864830 | | 10/2010 | |
| CN | 102049809 | | 5/2011 | |
| CN | 102050598 | | 5/2011 | |
| CN | 202208056 | | 5/2012 | |
| CN | 102581927 | | 7/2012 | |
| CN | 302025837 | | 8/2012 | |
| CN | 102806599 | | 12/2012 | |
| CN | 102950955 | | 3/2013 | |
| CN | 103481358 | | 1/2014 | |
| DE | 4320860 | | 1/1994 | |
| DE | 19640281 | | 4/1997 | |
| DE | 102010053520 | | 2/2012 | |
| EM | 000359971-0001 | | 1/2005 | |
| EM | 00359971-0002 | | 1/2005 | |
| EM | 00359971-0003 | | 1/2005 | |
| EM | 000359971-0005 | | 1/2005 | |
| EM | 001418057-0006 | | 3/2014 | |
| EM | 001417646-0015 | | 10/2014 | |
| EM | EU 001417646-0001 | | 10/2014 | |
| EM | EU 001417646-0010 | | 10/2014 | |
| EM | EU 001417737-0021 | | 10/2014 | |
| EP | 0511545 | | 11/1992 | |
| EP | 0558247 | | 9/1993 | |
| EP | 0320638 | | 6/1994 | |
| EP | 0734819 | | 10/1996 | |
| EP | 0970790 | | 1/2000 | |
| EP | 1005967 | | 6/2000 | |
| EP | 0940235 | | 7/2003 | |
| EP | 1717000 | | 11/2006 | |
| EP | 1787779 | | 5/2007 | |
| EP | 1930142 | | 6/2008 | |
| EP | 2460631 | | 6/2012 | |
| EP | 1905749 | | 7/2012 | |
| EP | 2065150 | | 3/2014 | |
| EP | 2944443 | | 11/2015 | |
| EP | 3095768 | | 11/2016 | |
| ES | 2087313 | | 7/1996 | |
| ES | 2187313 | | 6/2003 | |
| ES | 2285150 | | 11/2007 | |
| FR | 2313183 | | 3/1979 | |
| GB | 2233640 | | 1/1991 | |
| JP | H071418 | | 1/1995 | |
| JP | 2002285006 | A * | 10/2002 | ......... C04B 20/1062 |
| JP | 2004270406 | | 9/2004 | |
| JP | 2011195700 | A * | 10/2011 | |
| JP | D1454121 | | 10/2012 | |
| JP | 2014069350 | | 4/2014 | |
| KR | 771187 | B1 | 10/2007 | |
| KR | 10-2009-0108786 | | 10/2009 | |
| KR | 10-2014-0080212 | | 6/2014 | |
| KR | 300777994.000 | | 12/2014 | |
| KR | 1020150088686 | | 8/2015 | |
| WO | WO 198911457 | | 11/1989 | |
| WO | WO D037756-004 | | 12/1996 | |
| WO | WO D037756-007 | | 12/1996 | |
| WO | WO D037756-009 | | 12/1996 | |
| WO | WO 200043192 | | 7/2000 | |
| WO | WO 2001045921 | | 1/2001 | |
| WO | WO 2002007939 | | 1/2002 | |
| WO | WO 2003027042 | | 4/2003 | |
| WO | WO 2004004882 | | 1/2004 | |
| WO | WO 2005068146 | | 7/2005 | |
| WO | WO 2005097447 | | 10/2005 | |
| WO | WO 2006100321 | | 9/2006 | |
| WO | WO 2006134179 | | 12/2006 | |
| WO | WO 2007080059 | | 7/2007 | |
| WO | WO 2008000168 | | 1/2008 | |
| WO | WO 2008015596 | | 2/2008 | |
| WO | WO 2009010406 | | 1/2009 | |
| WO | WO 2010097727 | | 9/2010 | |
| WO | WO 2014108582 | | 7/2014 | |
| WO | WO 2016028780 | | 2/2016 | |

OTHER PUBLICATIONS

Machine translation of JP-2011195700-A.*
"Cambria introduces the new costal collection," [press release] Feb. 4, 2014, 2 pages.
"Certificate of Service of Complaint in *Cambria Company LLC* v. *Hirsch Glass Corp.*," Exhibit 1034 in IPR2022-00582, dated Feb. 11, 2022, 1 page.
"Certificate of Service of Complaint in *Cambria Company LLC* v. *Hirsch Glass Corp.*," Exhibit 1034 in IPR2022-00583, dated Feb. 11, 2022, 1 page.
"Certificate of Service of Complaint in *Cambria Company LLC* v. *Hirsch Glass Corp.*," Exhibit 1034 in IPR2022-00589, dated Feb. 11, 2022, 1 page.
"Curriculum Viate of Pierpaolo Tassone," Exhibit 1033 in IPR2022-00582, dated Feb. 11, 2022, 4 pages.
"Curriculum Viate of Pierpaolo Tassone," Exhibit 1033 in IPR2022-00583, dated Feb. 11, 2022, 4 pages.
"Declaration of Al Pacheco," Exhibit 1028 in IPR2022-00582, dated Feb. 10, 2022, 4 pages.
"Declaration of Al Pacheco," Exhibit 1028 in IPR2022-00583, dated Feb. 10, 2022, 4 pages.
"Declaration of Pierpaolo Tassone," Exhibit 1004 in IPR2022-00589, dated Feb. 8, 2022, 208 pages.
"Declaration of Pierpaolo Tassone," Exhibit 1031 in IPR2022-00582, dated Feb. 9, 2022, 123 pages.
"Declaration of Pierpaolo Tassone," Exhibit 1032 in IPR2022-00583, dated Feb. 9, 2022, 133 pages.
"MS International, Inc. General eBrochure 2014," Exhibit 1027 in IPR2022-00583 and IPR2022-00582, dated Feb. 28, 2014, 164 pages.
"MSI Surfaces, The Truth About Calacatta Marble," Exhibit 1029 in IPR2022-00583 and IPR2022-00582, dated Jan. 23, 2013, 13 pages.
"What Is the Standard Width of a Kitchen Countertop," Exhibit 1035 in IPR2022-00583 and IPR2022-00582, dated Aug. 30, 2019, 6 pages.
[No Author Listed], "Vadara Quartz Kitchen" available on or before Jan. 1, 2018, retrieved on Sep. 7, 2021, retrieved from URL <https://www.houzz.com/hznb/photos/vadara-quartz-kitchen-transitional-orange-county-phvw-vp~98923368>, 4 pages.
Allen + Roth, Santa Cecilia Granite Brown Kitchen Countertop Item #1068221Model #NG2002, published on or before Sep. 15, retrieved on Sep. 7, 2021, retrieved from URL <https://www.lowes.com/pd/allen-roth-Santa-Cecilia-Granite-Kitchen-Countertop-Sample/1000507485> , 2018, 6 pages.
Amendment Under 37 C.F.R. § 1.111, U.S. Appl. No. 15/911,547 to Benito Lopez et al., Nov. 24, 2020, 15 pages.
Breton Bretonstone Slabs, "Natural Stone Surfaces by Breton Technology", Breton, Cosentino Exhibit No. 1010 in Cases IPR2021-00214, IPR2021-00215, IPR2021-00216, and PGR2021-00010, 60 pages, filing date Nov. 24, 2020.
BretonUSA.com [online], "Bretonstone," 2019, retrieved on May 19, 2022, retrieved from URL<https://www.bretonusa.com/en/stone/news/bretonstone-bridge-saws>, 17 pages.
*Cambria Company LLC* vs *Consentino S.A., C & C North America Inc.*, Case No. IPR 2021-00214, U.S. Pat. No. 10,252,440, Petition for Inter Partes Review of U.S. Pat. No. 10,252,440, 88 pages, filing date Nov. 24, 2020.
*Cambria Company LLC* vs *Consentino S.A., C & C North America Inc.*, Case No. IPR 2021-00216, U.S. Pat. No. 10,195,762, Petition for Inter Partes Review of U.S. Pat. No. 10,195,762, 104 pages, filing date Nov. 24, 2020.

(56) References Cited

OTHER PUBLICATIONS

*Cambria Company LLC* vs *Consentino S.A., C & C North America Inc.*, Civil Action 6:20-CV-00894-ADA, Declaration of Kevin P. Trumble, Ph.D., In Support of Plaintiffs Motion For Preliminary Injunction Cosentino Exhibit No. 1014 in Cases IPR2021-00214, IPR2021-00216, and PGR2021-00010, 62 pages, filing date Nov. 24, 2020.

Carla Aston Design, Carla Aston Design and Portfolio, published on or before Oct. 27, 2012, retrieved from URL <https://carlaaston.com/designed/vein-cut-stone-texture-with-zen-ambience> 5 pages.

Certified English Translation of Chinese Application for Invention Patent Publication No. CN 1718403A to Liu, Exhibit No. 1007 in IPR2022-00589, dated Feb. 2022, pages.

Cole et al., "In pursuit of the cutting edge", Chicago Tribune, Dec. 7, 2010, Exhibit H, Cosentino Exhibit No. 1019 in Cases IPR2021-00214, IPR2021-00215, IPR2021-00216, and PGR2021-00010, 6 pages, filing date Nov. 24, 2020.

*Cosentino S.A.U and C & C North America Inc.*, Petitioners v. *Cambria Company LLC*, Patent Owner, US Patent and Trademark Office, Case No IPR 2021-00214, U.S. Pat. No. 10,252,440, Declaration of Dr. John R. Dorgan in Support of Petition for Inter Partes Review of U.S. Pat. No. 10,252,440, Cosentino Exhibit No. 1004, 104 pages, filing date Nov. 24, 2020.

*Cosentino S.A.U and C & C North America Inc.*, Petitioners v. *Cambria Company LLC*, Patent Owner, US Patent and Trademark Office, Case No. IPR 2021-00214, U.S. Pat. No. 10,252,440, Notice of Filing Date Accorded to Petition and Time for Filing Patent Owner Preliminary Response, 6 pages, Dec. 9, 2020.

*Cosentino S.A.U and C & C North America Inc.*, Petitioners v. *Cambria Company LLC*, Patent Owner, US Patent and Trademark Office, Case No. IPR 2021-00214, U.S. Pat. No. 10,252,440, Patent Owners Mandatory Notices Pursuant to 37 C.F.R. 42.8, 5 pages, filing date Dec. 15, 2020.

*Cosentino S.A.U and C & C North America Inc.*, Petitioners v. *Cambria Company LLC*, Patent Owner, US Patent and Trademark Office, Case No IPR 2021-00215, U.S. Pat. No. 9,289,923, Declaration of Dr. John R. Dorgan in Support of Petition for Inter Partes Review of U.S. Pat. No. 9,289,923, Cosentino Exhibit No. 1004, 134 pages, filing date Nov. 24, 2020.

*Cosentino S.A.U and C & C North America Inc.*, Petitioners v. *Cambria Company LLC*, Patent Owner, US Patent and Trademark Office, Case No. IPR 2021-00215, U.S. Pat. No. 9,289,923, Notice of Filing Date Accorded to Petition and Time for Filing Patent Owner Preliminary Response, 5 pages, Dec. 15, 2020.

*Cosentino S.A.U and C & C North America Inc.*, Petitioners v. *Cambria Company LLC*, Patent Owner, US Patent and Trademark Office, Case No. IPR 2021-00215, U.S. Pat. No. 9,289,923, Patent Owners Mandatory Notices Pursuant to 37 C.F.R. 42.8, 5 pages, filing date Dec. 15, 2020.

*Cosentino S.A.U and C & C North America Inc.*, Petitioners v. *Cambria Company LLC*, Patent Owner, US Patent and Trademark Office, Case No IPR 2021-00215, U.S. Pat. No. 9,289,923, Petition for Inter Partes Review of U.S. Pat. No. 9,289,923, 88 pages, filing date Nov. 24, 2020.

*Cosentino S.A.U and C & C North America Inc.*, Petitioners v. *Cambria Company LLC*, Patent Owner, US Patent and Trademark Office, Case No. IPR 2021-00216, U.S. Pat. No. 10,195,762, Notice of Filing Date Accorded to Petition and Time for Filing Patent Owner Preliminary Response, 5 pages, Dec. 15, 2020.

*Cosentino S.A.U and C & C North America Inc.*, Petitioners v. *Cambria Company LLC*, Patent Owner, US Patent and Trademark Office, Case No. IPR 2021-00216, U.S. Pat. No. 10,195,762, Patent Owners Mandatory Notices Pursuant to 37 C.F.R. 42.8, 5 pages, filing date Dec. 15, 2020.

*Cosentino S.A.U and C & C North America Inc.*, Petitioners v. *Cambria Company LLC*, Patent Owner, US Patent and Trademark Office, Case No PGR 2021-00010, U.S. Pat. No. 10,773,418, Declaration of Dr. John R. Dorgan in Support of Petition for Inter Partes Review of U.S. Pat. No. 10,773,418, Cosentino Exhibit No. 1004, 169 pages, filing date Nov. 24, 2020.

*Cosentino S.A.U and C & C North America Inc.*, Petitioners v. *Cambria Company LLC*, Patent Owner, US Patent and Trademark Office, Case No. PGR2021-00010 U.S. Pat. No. 10,773,418, Notice of Filing Date Accorded to Petition and Time for Filing Patent Owner Preliminary Response, 6 pages, Dec. 9, 2020.

*Cosentino S.A.U and C & C North America Inc.*, Petitioners v. *Cambria Company LLC*, Patent Owner, US Patent and Trademark Office, Case No. PGR2021-00010, U.S. Pat. No. 10,773,418, Petition for Post Grant Review of U.S. Pat. No. 10,773,418, 120 pages, filing date Nov. 24, 2020.

*Cosentino S.A.U and C & C North America Inc.*, Petitioners v. *Cambria Company LLC*, Patent Owner, US Patent and Trademark Office, Case No. PGR2021-00010, U.S. Pat. No. 10,773,418, Patent Owners Mandatory Notices Pursuant to 37 C.F.R. 42.8, 5 pages, filing date Dec. 15, 2020.

*Cosentino S.A.U and C & C North America Inc.*, Petitioners v. *Cambria Company LLC*, Patent Owner, US Patent and Trademark Office, Civil Action 6:20-CV-00894-ADA, Declaration of Kevin P. Trumble, Ph.D., in Support of Plaintiffs Motion for Preliminary Injunction, Cosentino Exhibit No. 1014 in Case IPR2021-00215, 62 pages, filing date Nov. 24, 2020.

*Cosentino S.A.U and C & C North America Inc.*, Petitioners v. *Cambria Company LLC*, Patent Owner, US Patent and Trademark Office, Declaration of Dr. John Dorgan in Support of Petition for Inter Partes Review of U.S. Pat. No. 10,195,762, Cosentino Exhibit No. 1004 in Case IPR2021-00216, 222 pages, filing date Nov. 24, 2020.

Cosentino's, Caroline Summer Granite Brown Kitchen Countertop Item #416339Model #902166, published on or before Aug. 21, 2017, retrieved on Sep. 7, 2021, retrieved from URL <https://www.lowes.com/pd/SenSa-Caroline-Summer-Granite-Kitchen-Countertop-Sample/50142019?cm_mmc=shp-_-c-_-prd-_-kab-_-google-_-pla-_-233-_-soscountertopproductandaccess-_-50142019-_-0&placeholder=null&ds_rl=1286981&gclid=EAIaIQobChMIj-jD1ZuQ8AIVaz6tBh0wowA1EAQYBSABEgLIKPD_BwE&gclsrc=aw.ds> 11 pages.

Countertops and Architectural Surfaces, The Official Publication of the International Surface Fabricators Association, vol. 8, Issue 1, Quarter 1, 2015, Cosentino Exhibit No. 1023 in Cases IPR2021-00214, IPR2021-00215, IPR2021-00216, and PGR2021-00010, 52 pages, filing date Nov. 24, 2020.

DiClerico, "What Is the Difference Between Quartz and Quartzite?", Exhibit K, Cosentino Exhibit No. 1022 in Cases IPR2021-00214, IPR2021-00215, IPR2021-00216, and PGR2021-00010, 3 pages. Apr. 9, 2016.

Exhibit J, Galloway Cambria 2015, Cosentino Exhibit No. 1021 in Cases IPR2021-00214, IPR2021-00215, IPR2021-00216, and PGR2021-00010, 3 pages, filing date Nov. 24, 2020.

ExpressKitchenAndBath.com [online], "Leathered Finishes," available on or before Jul. 8, 2018, via Internet Archive: Wayback Machine URL <http://web.archive.org/web/20180708113334/http://expresskitchenandbath.com/1277-2/>, retrieved on May 18, 2022, URL<http://expresskitchenandbath.com/1277-2/>, 4 pages.

Freedman, "Clay Product-Faced Precast Concrete Panels," PCI Journal, Jan.-Feb. 1994, 39: 20-36, 17 pages.

HanStone Quarts by Hanwha Surfaces "Specifications", HanStone Quarts, Cosentino Exhibit No. 1011 in Cases IPR2021-00214, IPR2021-00215, IPR2021-00216, and PGR2021-00010, 48 pages, filing date Nov. 24, 2020.

*Hirsch Glass Corp., d/b/a Spectrum Quartz*, Petitioner, v. *Cambria Company LLC*, Case No. IPR2022-00582, Patent Owner; U.S. Pat. No. 9,718,303, filed on Feb. 11, 2022, 174 pages.

*Hirsch Glass Corp., d/b/a Spectrum Quartz*, Petitioner, v. *Cambria Company LLC*, Case No. IPR2022-00583, Patent Owner; U.S. Pat. No. 10,300,626, filed on Feb. 11, 2022, 172 pages.

*Hirsch Glass Corp., d/b/a Spectrum Quartz*, Petitioner, v. *Cambria Company LLC*, Case No. IPR2022-00589, Patent Owner; U.S. Pat. No. 9,993,942, filed on Feb. 10, 2022, 184 pages.

Invention Patent Application for Chinese Publication No. 102806599 A, "Quartz stone with predetermined three-dimensional colored patterns and linear patterns and preparation method thereof", Eng-

(56) References Cited

OTHER PUBLICATIONS lish Translation and Certification, Exhibit 1006 in Cases IPR2021-00214, IPR2021-00215, IPR2021-00216, and PGR2021-00010, 54 pages, dated Dec. 5, 2012,.

Invention Patent Application for WO Publication No. 2008/000168, "A Mold System For Making The Products With Multi-Color 3D Patterns and Its Methods", English Translation and Certification, Exhibit 1008 in Cases IPR2021-00214, IPR2021-00215, IPR2021-00216, and PGR2021-00010, 63 pages, dated Jan. 3, 2008.

Kai Herrmann, "5th pole Golden abstract" photograph, available on or before Jan. 1, 2009, retrieved on Sep. 7, 2021, retrieved from URL <https://www.saatchiart.com/art/Photography-5th-pole-golden-abstract/262364/1237075/view>, 6 pages.

MGTStoneCo.com [online], "Stone Surfaces Finishes," available on or before Dec. 13, 2017, via Internet Archive: Wayback Machine URL <http://web.archive.org/web/20171213055415/https://www.mgtstoneco.com/info/stone-surface-finishes>, retrieved on May 18, 2022, URL<https://www.mgtstoneco.com/info/stone-surface-finishes>, 5 pages.

MSI, "The Truth About Calacatta Marble", Jan. 23, 2013, Cosentino Exhibit No. 1018 in Cases IPR2021-00214, IPR2021-00215, IPR2021-00216, and PGR2021-00010, 12 pages, filing date Nov. 24, 2020.

Neal's Design Remodel, Granite vs. Quartz in the Kitchen, May 23, 2011, retrieved on Sep. 7, 2021, <https://www.youtube.com/watch?app-desktop&v=2d3XcgtUybU> [Video Submission].

Ninevian, "Abstract vector seamless background wallpaper stock ID:477881937", published on Aug. 28, 2013, retrieved on Sep. 7, 2021, retrieved from URL <https://www.istockphoto.com/vector/abstract-vector-seamless-background-wallpaper-gm477881937-26697001>, 8 pages.

Patent Owner's Preliminary Response Under 37 C.F.R § 42.107, Case No. IPR2022-00582, Patent Owner; U.S. Pat. No. 9,718,303, filed on May 17, 2022, 64 pages.

Patent Owner's Preliminary Response Under 37 C.F.R § 42.107, Case No. IPR2022-00583, Patent Owner; U.S. Pat. No. 10,300,626, filed on May 17, 2022, 67 pages.

Patent Owner's Preliminary Response Under 37 C.F.R § 42.107, Case No. IPR2022-00589, Patent Owner; U.S. Pat. No. 9,993,942, filed on May 17, 2022, 71 pages.

Professor John R. Dorgan Curriculum, Chemical Engineering and Materials Sciences Michigan State University, Cosentino Exhibit No. 1003 in Cases IPR2021-00214, IPR2021-00215, IPR2021-00216, and PGR2021-00010, 9 pages, filing date Nov. 24, 2020.

Prosecution History of U.S. Pat. No. 10,300,626, Exhibit 1024 in IPR2022-00583, filed Feb. 11, 2022, 263 pages.

Prosecution History of U.S. Pat. No. 9,186,819, Exhibit 1003 in IPR2022-00589, filed Feb. 9, 2022, 207 pages.

Prosecution History of U.S. Pat. No. 9,718,303, Exhibit 1022 in IPR2022-00580, filed Feb. 11, 2022, 160 pages.

Prosecution History of U.S. Pat. No. 9,993,942, Exhibit 1002 in IPR2022-00589, filed Feb. 10, 2022, 470 pages.

Restructured Surfaces.com [online], "Surface Inclusions," retrieved on Jun. 15, 2022, retrieved from URL <https://restructured-surfaces.com/solution/surface-inclusions/>, 3 pages.

Santamargherita.com [online], "SM Quartz," available on or before Sep. 18, 2020, via Internet Archive: Wayback Machine URL <http://web.archive.org/web/20200901000000*/https://www.santamargherita.net/us/sm-quartz/>, retrieved on May 18, 2022, URL<https://www.santamargherita.net/us/sm-quartz/>, 8 pages.

Stone & Tile Shoppe, Inc., "12×12 Granite Field Tile SKU: ISHT1134", published on or before May 1, 2019, 1 page.

Stonecontact.com [online], "Artificial Stone Factory Price Calacatta Marble Vein Quartz Slabs", available on or before Sep. 7, 2021, retrieved on Sep. 7, 2021, retrieved from URL, <https://www.stonecontact.com/products-a642705/artificial-stone-factory-price-calacatta-marble-vein-quartz-slabs> , 8 pages.

TenaxUSA.com [online], "Tenax CNC and Frankfurt Brush Finish Kit," May 13, 2013, retrieved on May 18, 2022, retrieved from URL<http://https://tenaxusa.wordpress.com/tag/leather-finish/>, 7 pages.

Vadaraquartz.com [online], "Vadara Collections", available on or before Sep. 20, 2020, via Internet Archive: Wayback Machine URL <http://web.archive.org/web/20200920181351/https://www.vadaraquartz.com/colors/> retrieved on Sep. 7, 2021, URL , <https://www.vadaraquartz.com/colors/> ,16 pages.

Yip, "Design innovations change the game in kitchen renovations", The Washington Post, Apr. 18, 2014, Exhibit I, Cosentino Exhibit No. 1020 in Cases IPR2021-00214, IPR2021-00215, IPR2021-00216, and PGR2021-00010, 4 pages, filing date Nov. 24, 2020.

International Preliminary Report on Patentability in International Appln. No. PCT/US2022/029287, mailed on Nov. 23, 2023, 9 pages.

International Search Report and Written Opinion in International Appln. No. PCT/US2022/029287, mailed on Sep. 28, 2022, 12 pages.

Multi-HousingNews.com, [online] "Silestone Launches Volcano Texture Surfaces," MultiHousingNews.com, Dec. 20, 2010, 9 pages.

Silestone.com [online], "Silestone Textures Quartz Countertops," available on or before Oct. 1, 2011, via Internet Archive: Wayback Machine URL<http://web.archive.org/web/20111001032733/http://www.silestoneusa.com/quartz/silestone-textures.cfm>, retrieved on Feb. 9, 2023, URL<http://www.silestoneusa.com/quartz/silestone-textures.cfm>, 2 pages.

Invitation to Pay Additional Fees and, Where Applicable, Protest Fee in International Appln. No. PCT/US20252/029287, mailed on Jul. 22, 2022, 2 pages.

Rotaxmetals, "Metals 101: Composition, Nature, and Characteristics of Brass," available on or before Aug. 2020, retrieved from URL<https://rotaxmetals.net/metals-101-com position-nature-and-characteristics-of-brass/>, 8 pages.

\* cited by examiner

METALLIC STONE SLABS, SYSTEMS, AND METHODS

CROSS-REFERENCE TO RELATED APPLICATIONS

This application claims priority to U.S. Application Ser. No. 63/306,876, filed on Feb. 4, 2022 and U.S. Application Ser. No. 63/188,403, filed on May 13, 2021. The disclosure of the prior applications are considered part of the disclosure of this application, and are incorporated in their entirety into this application.

TECHNICAL FIELD

This document describes stone slab products, systems, and processes for stone slab products, for example, stone slabs suitable for use in living or working spaces (e.g., along a countertop, table, floor, or the like) and having metal components that provide a metallic finished surface.

BACKGROUND

Stone slabs are a commonly used building material. Granite, marble, soapstone, and other quarried stones are often selected for use as countertops due to their aesthetic properties. Stone slabs may also be formed from a combination natural and other materials that can provide improved stain-resistant or heat-resistant properties, aesthetic characteristics, reproducibility, etc. Some stone slabs have been made from a combination of particulate mineral material and binder, such as a polymer resin or cement, and have a colored or veined pattern.

SUMMARY

Some embodiments described herein include systems and processes for forming stone slabs suitable for use in living or working spaces. In some optional embodiments, slabs can be manufactured by forming a cured and hardened slab that includes a metal material. For example, slabs can be manufactured by at least partially filing a slab mold with one or more particulate mineral mixes, including a particulate mineral mix made up partially, predominantly, or completely of metal, resin binder, and/or one or more pigments, and then curing and/or hardening the contents of the slab mold to form a slab. In some embodiments, a stone slab includes multiple regions of different particulate mineral mixes that have different characteristics, such as different metal content, chemical composition, sheen (e.g., metallic sheen), hardness, thickness, roughness, gloss, etc.

In an example embodiment, a processed slab is formed from a plurality of particulate mineral mixes, and includes a slab width that is at least 2 feet, a slab length that extends perpendicular to the slab width and that is at least 6 feet, the slab length and the slab width defining a top major surface, a slab thickness that extends perpendicular to the slab width and the slab length, the slab length greater than the slab width, the slab width greater than the slab thickness, and a first pattern defined by a first particulate mineral mix. A first pattern is defined by a first particulate mix, the first pattern exposed along the top major surface of the slab, and the first particulate mix comprising first metallic particles having a first mesh size and second metallic particles having a second mesh size different than the first mesh size.

Various embodiments can include some, all, or none of the following features. The first metallic particles can make up greater than 10% by weight ("wt %") of the first particulate mix. The second metallic particles can make up greater than 40 wt % of the first particulate mix. The first metallic particles can be between 200 US mesh and 400 US mesh. The second metallic particles can be between 50 US mesh and 100 US mesh. The first metallic particles can be between 200 US mesh and 400 US mesh and make up between 5 wt % and 20 wt % of the first particulate mix. The second metallic particles can be between 50 US mesh and 100 US mesh and make up between 20 wt % and 75 wt % of the first particulate mix. The second particulate mineral mix can make up greater than 10% of the overall wt % of the processed slab. The first metallic particles and the second metallic materials can be a same material. The first metallic particles and the second metallic particles can be stainless steel. The first metallic particles and the second metallic particles can be selected from the group consisting of copper, brass, nickel, and aluminum. The first US mesh size can be less than 50% of the second US mesh size. The first pattern can be exposed along the top major surface of the slab, and defining a first thickness that extends perpendicular to the slab width and the slab length, and a second pattern defined by a second particulate mineral mix different from the first particulate mineral mix, the second pattern exposed along the top major surface of the slab and defining a second thickness that extends perpendicular to the slab width and the slab length, the first thickness of the first pattern different than the second thickness of the second pattern. The first pattern can be exposed along a bottom major surface of the slab. The first pattern exposed along the top major surface of the slab can have a first texture based on the first particulate mineral mix, and the second pattern exposed along the top major surface of the slab can have a second texture, different from the first texture, based on the second particulate mineral mix. The first texture can have a first roughness and the second texture has a second roughness that is different from the first roughness. The first pattern can have a first average gloss value and the second pattern can have a second average gloss value that is different from the first average gloss value. The first pattern can have a first average thickness perpendicular to the slab width and the slab length, and the second pattern can have a second average thickness perpendicular to the slab width and the slab length, and wherein the first average thickness is different from the second average thickness.

In an example implementation, a processed slab formed from a plurality of particulate mineral mixes includes a slab width that is at least 2 feet; a slab length that extends perpendicular to the slab width and that is at least 6 feet, the slab length and the slab width defining a top major surface; a slab thickness that extends perpendicular to the slab width and the slab length, the slab length greater than the slab width, the slab width greater than the slab thickness; and a first pattern defined by a first particulate mix, the first pattern exposed along the top major surface of the slab, and the first particulate mix comprising greater than 50 wt % of first metallic particles.

Various embodiments can include some, all, or none of the following features. The first metallic particles can make up greater than 10 wt % of the first particulate mix. The second metallic particles can make up greater than 40 wt % of the first particulate mix. The first metallic particles can be between 140 US mesh and 400 US mesh. The second metallic particles can be between 50 US mesh and 140 US mesh. The first metallic particles can be between 1400 US mesh and 400 US mesh and make up between 5 wt % and 20 wt % of the first particulate mix. The second metallic particles can be between 50 US mesh and 140 US mesh and make up between 20 wt % and 75 wt % of the first particulate mix. The second particulate mineral mix can make up greater than 10 wt % of the overall wt % of the processed slab. The first metallic particles and the second metallic materials can be a same material. The first metallic particles and the second metallic particles can be stainless steel. The first metallic particles and the second metallic particles can be selected from the group consisting of copper, brass, nickel, and aluminum. The first US mesh size can be less than 50% of the second US mesh size. The first pattern can be exposed along the top major surface of the slab, and defining a first thickness that extends perpendicular to the slab width and the slab length, and a second pattern defined by a second particulate mineral mix different from the first particulate mineral mix, the second pattern exposed along the top major surface of the slab and defining a second thickness that extends perpendicular to the slab width and the slab length, the first thickness of the first pattern different than the second thickness of the second pattern. The first pattern can be exposed along a bottom major surface of the slab. The first pattern exposed along the top major surface of the slab can have a first texture based on the first particulate mineral mix, and the second pattern exposed along the top major surface of the slab can have a second texture, different from the first texture, based on the second particulate mineral mix. The first texture can have a first roughness and the second texture has a second roughness that is different from the first roughness. The first pattern can have a first average gloss value and the second pattern can have a second average gloss value that is different from the first average gloss value. The first pattern can have a first average thickness perpendicular to the slab width and the slab length, and the second pattern can have a second average thickness perpendicular to the slab width and the slab length, and wherein the first average thickness is different from the second average thickness.

In an example implementation, a process of forming a processed slab from a plurality of different particulate mineral mixes includes dispensing a first particulate mineral mix to a first set of regions of a slab mold, the first particulate mix comprising first metallic particles having a first mesh size and second metallic particles having a second mesh size different than the first mesh size; dispensing a second particulate mineral mix to a second set of regions of the slab mold; contemporaneously vibrating and compacting the first particulate mineral mix and the second particulate mineral mix arranged in the slab mold so as to form a processed molded slab that is generally rectangular and has a slab thickness and a major surface having a slab width of at least 2 feet and a slab length of at least 6 feet; and curing the processed molded slab into a cured slab.

Various embodiments can include some, all, or none of the following features. The first metallic particles can make up greater than 10 wt % of the first particulate mix and the second metallic particles can make up greater than 40 wt % of the first particulate mix. The first metallic particles can be between 200 US mesh and 400 US mesh and make up between 5 wt % and 20 wt % of the first particulate mix. The second metallic particles can be between 50 US mesh and 100 US mesh and make up between 20 wt % and 75 wt % of the first particulate mix. The process can include abrading the major surface of the cured slab at locations of the first particulate mineral mix and the second particulate mineral mix with an abrading head to partly remove portions of the major surface such that the first particulate mineral mix in the first set of regions define a first thickness perpendicular to the slab width and the slab length, and the second particulate mineral mix in the second set of regions define a second thickness perpendicular to the slab width and the slab length.

In an example implementation, a process of forming a processed slab from a plurality of different particulate mineral mixes includes dispensing a first particulate mineral mix to a first set of regions of a slab mold, dispensing a second particulate mineral mix to a second set of regions of the slab mold, contemporaneously vibrating and compacting the first particulate mineral mix and the second particulate mineral mix arranged in the slab mold so as to form a processed molded slab that is generally rectangular and has a slab thickness and a major surface having a slab width of at least 2 feet and a slab length of at least 6 feet, curing the processed molded slab into a cured slab, and abrading the major surface of the cured slab at locations of the first particulate mineral mix and the second particulate mineral mix with an abrading head to partly remove portions of the major surface such that the first particulate mineral mix in the first set of regions define a first thickness perpendicular to the slab width and the slab length, and the second particulate mineral mix in the second set of regions define a second thickness perpendicular to the slab width and the slab length.

Various implementations can include some, all, or none of the following features. The first particulate mineral mix can have a first hardness in the cured slab and the second particulate mineral mix can have a second hardness different from the first hardness in the cured slab. Abrading a portion of the major surface of the cured slab can include removing an amount of the major surface in the first set of regions to a first average thickness perpendicular to the slab width and the slab length that is different from a second average thickness removed from the second set of regions, wherein a first texture is based on the first average thickness and a second texture is based on the second average thickness. The first particulate mineral mix can include a first percent volume of quartz, and the second particulate mineral mix can include a second percent volume of quartz that is less than the first percent volume of quartz. One of the first set of regions and the second set of regions can define a majority of the major surface, and the other of the first set of regions and the second set of regions can define a vein extending at least partly across the major surface. Abrading the major surface of the cured slab can include abrading substantially an entirety of the major surface. Abrading the major surface of the cured slab can include abrading using an abrasive brush. The first set of regions can have a first texture and the second set of regions can have a second texture different from the first texture. The first texture can have a first roughness and the second texture can have a second roughness that is different from the first roughness. The first set of regions can have a first average gloss value and the second set of regions can have a second average gloss value that is different from the first average gloss value. The first set of regions can have a first average thickness perpendicular to the slab width and the slab length, and the second set of regions can have a second average thickness perpendicular to the slab width and the slab length, and wherein the first average thickness is different from the second average thickness. Abrading the major surface can include passing a sequence of different abrading brushes having different abrasive grits over the entirety of the major surface. Abrading the major surface can include passing the abrading head over the entire major surface with consistent operating parameters. Abrading the major surface can include passing a second abrading head over the entire major surface with consistent operating parameters.

The systems and techniques described here may provide one or more of the following advantages. First, some embodiments described herein include stone slabs having an appearance of metal. For example, some or all of the stone slab is defined by a particulate mineral mix that includes metal, such as stainless steel particles. The particulate mineral mix can be arranged in a vein or other pattern, and/or can define some or all of a top major surface of the finished slab.

Second, some embodiments described herein provide an aesthetic appearance that accentuates and/or exaggerates various characteristics of quarried stone slabs. For example, some stone slabs described herein provide a vein pattern having geometric characteristics suggestive of vein patterns of quarried stone slabs. The vein patterns are created by a particulate mineral mix having a high metal content such that the composition, color, sheen, and/or other characteristics differ from a vein pattern of a quarried stone slab.

Third, some embodiments described herein provide a vein that has the appearance of metal. For example, not only does the vein pattern have a metallic shimmer, but in some embodiments, at least a portion of a top major surface looks and/or feels like metal. The vein pattern may have a substantially consistent surface appearance over the entire surface of the vein. For example, the vein pattern has a substantially consistent metal surface and does not have the appearance of metal flakes or particles in a non-metal mix. Alternatively or additionally, the vein pattern has a varied metal surface that has the appearance of metal flakes or particles in a metal mix/carrier.

Fourth, a system can provide stone slab products that have a tactile and/or visible texture. For example, in some embodiments, one or more surfaces of the slab includes regions of different tactile and/or visible characteristics. Fifth, the system can provide stone slab products that have a texture that resembles that of quarried stone. Sixth, the system can provide stone slab products that have an aesthetic appeal similar to that of quarried stone and with improved performance benefits such as heat and stain resistance and reproducibility, but without the cost and/or environmental impact associated with stone quarrying. Seventh, the system can modify existing stone slab products to provide additional product options from a common base product.

The details of one or more implementations are set forth in the accompanying drawings and the description below. Other features and advantages will be apparent from the description and drawings, and from the claims.

DETAILED DESCRIPTION

In general, this document describes stone slabs, systems and methods that provide a slab having one or more metal components. For example, some embodiments provide stone slabs that include a pattern, such as a vein pattern, defined by a particulate mineral mix having a relatively high metal particulate content. The example pattern provides an aesthetic appearance of a metal pattern or vein on a major surface of the stone slab. Additionally, this document describes systems and techniques in which processed stone slabs having textured faces can be manufactured by abrading a cured (e.g., hardened) slab having exposed regions of different component materials that abrade or erode differently (e.g., at different rates when subjected to a common treatment), and/or otherwise reveal different textures due to the abrasion. For example, hardened materials are worn down in different manners to produce one or more different surface characteristics based on the component materials (e.g., and in an example embodiment does not include imparting a pattern into soft, uncured materials and then allowing the pattern to harden). In some embodiments, an example stone slab includes varying texture that caricatures natural erosion and fissuring and/or provides different characteristics that create a predetermined aesthetic and tactile characteristics.

Figure 1:
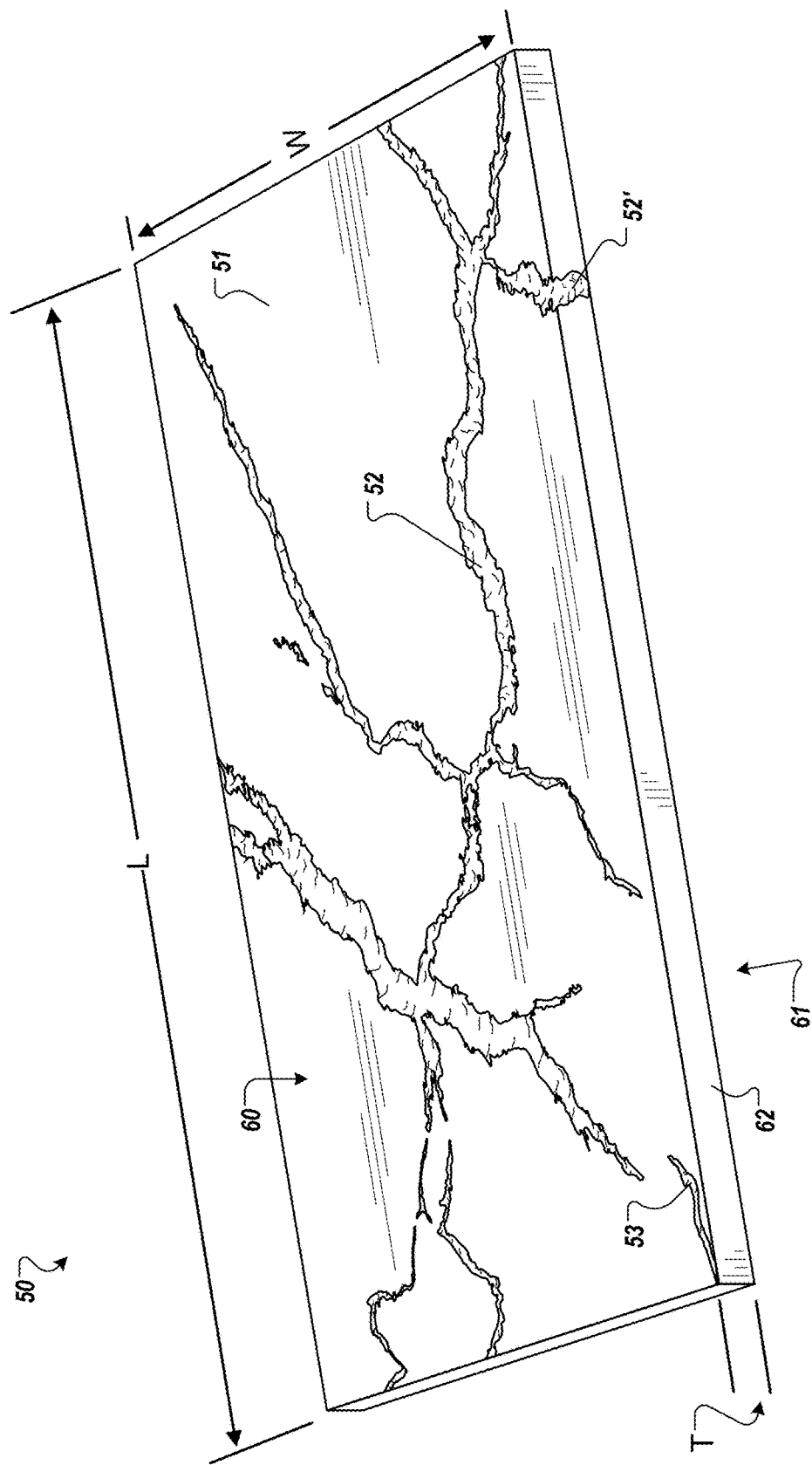
FIG. 1 is a perspective view of an example processed slab, in accordance with some embodiments.

Referring to FIG. 1, an example processed slab 50 is shown having a first region 51 of a primary or background fill, a second region 52, and a third region 53 that include striations or veins (e.g., according to a predefined pattern). The region 51, region 52, and/or region 53 have features that differ in one or more respects. In an example embodiment, the regions 52 and/or 53 are defined by a particulate mineral mix having a relatively high metal content. The exposed surface of regions 52 have a metallic aesthetic appearance. Alternatively or additionally, the regions 52 and/or 53 have surface characteristics or textures that differ compared to one another and primary or background fill 51, such as a different roughness (or smoothness), gloss, metallic sheen, or other perceptible difference.

In various example embodiments, slab 50 includes any number, combination, pattern, and/or proportion of particulate fills and mixes. For example, the processed slab 50 can include two, three, four, five, ten, or any appropriate number of particulate mineral mixes (e.g., dispensed sequentially or otherwise maintained separately within the slab mold) to provide any appropriate number of regions. The regions provide an aesthetic appearance of different perceptible patterns/veins. In another example, the primary fill 51 may not occupy a majority of the processed slab 50 (e.g., the processed slab 50 may include a substantially continuous collection of regions without any one of the particulate fill types occupying an identifiably primary or major portion of the volume of the processed slab 50). In some embodiments, processed slab 50 includes one or more regions 51, 52, 53 of different particulate mineral mixes and/or different surface characteristics (e.g., according to a predefined pattern).

The processed slab 50 has a width W and a length L. For example, the slab 50 is at least 2 feet wide by at least 6 feet long, and between about 3 feet and 5 feet wide and between about 6 feet and 14 feet long, or about 4.5 feet wide (more particularly, about 140 cm wide) by about 10 feet long (more particularly, about, 310 cm long)). In general, the length L and the width W define a top major surface 60 (e.g., face) and a bottom major surface (e.g., face) 61. The processed slab 50 also has a thickness T between the top major surface 60 and the bottom major surface 61. The periphery of the processed slab 50 includes a collection of edge faces 62.

Example slab 50 includes a quartz material and/or other particulate mineral material that, when mixed with pigments and a resin binder and subsequently compressed and cured, provides a hardened slab product suitable for use in living or working spaces (e.g., along a countertop, table, floor, or the like). As shown in FIG. 1, each slab 50 may be formed from a combination of particulate mineral mixes that have different hardness or resistances to abrasion, different material compositions, and optionally different colors and textures. The particulate mineral mixes are arranged in a slab mold (e.g., slab mold 730 shown in FIG. 7), to provide the predetermined regions of selected striations/veins and/or other patterns. In some embodiments, the patterns are generally repeatable for each separately molded slab, for example by dispensing different particulate mineral mixes (e.g., different hardness, different resistance to abrasion, different pigments, different compositions, different additives) according to predefined and repeatable dispensation pattern into the mold until filled. The mold is closed and then transported for compaction, curing, abrading, and other operations.

As shown in FIG. 1, the pattern of regions 51, 52, and 53 provide a surface appearance having one or more veins or other visible features. In some embodiments, veins 52 and 53 extend at least partly across the major surfaces 60, 61 and/or the edges 62 (the thickness T). For example, slab 50 can include a widthwise vein that extends partly or entirely in a generally widthwise direction, a lengthwise vein that extends partly or entirely in a generally lengthwise direction. Alternatively or additionally, one or more veins extend in angled or varying directions partly or entirely across the length L and/or width W of the processed slab 50. In some embodiments, the veins also extend partly or entirely (such as vein 52') through the thickness of the processed slab 50 (e.g., thereby providing a vein appearance even when the slab is cut and edged to specific shapes in living or working space, such as along a countertop, table, floor, or the like). In some embodiments, each processed slab 50 in a set of separately molded slabs can include the regions of different particulate mineral mixes dispensed into the mold (e.g., such as mold 730 shown in FIG. 7) according to predefined and repeatable dispensation patterns, such that multiple slabs 50 in the set of separately molded slabs can have substantially the same appearance to one another.

The different mixes can be compaction molded and cured in the mold (e.g., all particulate mineral mixes are initially uncured and then contemporaneously cured in the mold) so as to provide the hardened slab 50. One or more of the mixes that are used to form the composite stone material can include organic polymer(s) and inorganic (e.g., mineral) particulate component. The inorganic particulate component may include one or more metals, such as stainless steel, brass, copper, bronze, aluminum, zinc, titanium, gold, silver, iron, magnesium, tungsten, nickel, tin, etc., one or more of silicon, basalt, glass, diamond, rocks, pebbles, shells, a variety of quartz containing materials, such as, for example, crushed quartz, sand, quartz particles, and the like, and/or any combination thereof. In an example embodiment, one or more of the mixes include a substantial percentage of metal by weight. For example, one or more of the mixes include predominately metal (e.g., more metal than quartz or other mineral composition by weight). A particulate mineral mix that defines region 52 includes predominately metal, and particulate mineral mixes that define regions 51 and 53 include predominately quartz. In some embodiments, all of the particulate mineral mixes of regions 51, 52, and 53, (e.g., that make up the entirety of slab 50) include a quartz material, such as at least 3 wt %, at least 5 wt %, at least 7 wt %, or more of a quartz material. Alternatively, some of the particulate mineral mixes include quartz and some of the mineral mixes (e.g., that are predominantly metal) do not include quartz. For example, the particulate mineral mixes of regions 51 and 53 include quartz, and the particulate mineral mix of region 52 does not include quartz.

In the hardened, cured form of the slab 50, the organic and inorganic materials can be linked using a binder, which may include for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. Some or all of the mixes dispensed in the mold may include components that are combined in a mixing apparatus prior to being conveyed to the mold. The mixing apparatus can be used to blend raw material (such as the quartz material, metal material, organic polymers, unsaturated polymers, and the like) at various ratios.

In various example embodiments, some or all of the particulate mineral mixes of slab 50 include about 1-95% quartz aggregates and about 3-15% polymer resins. In addition, various additives may be added to the raw materials in the mixing apparatus, such additives may include colorants, dyes, pigments, chemical reagents, antimicrobial substances, fungicidal agents, and the like, or any combination thereof. In alternative embodiments, some or all of the quantity of quartz aggregates (mentioned above) can be replaced with or include porcelain and/or ceramic aggregate material. In an example embodiment, slab 50 includes a first particulate mineral mix that defines region 51, a second particulate mineral mix that defines region 52, a third particulate mineral mix that defines region 53, and/or one or more particulate mineral mixes that define one or more regions of slab 50. In various example embodiments, the first particulate mineral mix that defines region 51 and/or the third particulate mineral mix that defines region 53 includes greater than 50 wt % quartz, such as between 50 wt % and 85 wt %, between 50 wt % and 75 wt %, between 50 wt % and 65 wt %, or about 55 wt % quartz. The first particulate mineral mix and/or third particulate mineral mix includes between 3 wt % and 15 wt % resin binder, between 3 wt % and 10 wt % resin binder, or between 5 wt % and 10 wt % resin binder. The first particulate mineral mix and/or third particulate mineral mix includes between 5 wt % and 50 wt % silicon, between 10 wt % and 45 wt % silicon, between 15 wt % and 40 wt % silicon, or about 35 wt % silicon. Alternatively or additionally, the first particulate mineral mix and/or the third particulate mineral mix includes one or more additional components such as between 0.1 wt % and 3 wt %, 0.5 wt % and 2 wt %, or about 1 wt % styrene, and/or between 0.1 wt % and 5 wt % pigment, 0.2 wt % and 3 wt % pigment, or about 0.4 wt % pigment. For example, the first particulate mineral mix includes about 57 wt % quartz, about 35 wt % silicon, about 7 wt % resin binder, and about 1.5 wt % additives, such as styrene and pigment.

The second particulate mineral mix that defines region 52 does not include predominately quartz. For example, the second particulate mineral mix that defines region 52 includes a predominately metal composition and includes a relatively small amount of quartz or no quartz. In various example embodiments, the second particulate mineral mix includes greater than 50 wt % metal particulate, greater than 60 wt % metal particulate, greater than 70 wt % metal particulate, greater than 80 wt % metal particulate, or more. The second particulate mix includes less than 50 wt % quartz, less than 40 wt % quartz, less than 30 wt % quartz, less than 20 wt % quartz, less than 15 wt % quartz, less than 10 wt % quartz, less than 5 wt % quartz, or about 0 wt % quartz, or between 2 wt % and 50 wt % quartz, between 3 wt % and 40 wt % quartz, or between 5 wt % and 30 wt % quartz. Alternatively or additionally, the second particulate mineral mix includes one or more additional components, such as between 5 wt % and 30 wt % silicon, between 7 wt % and 25 wt % silicon, between 10 wt % and 20 wt % silicon, or about 15 wt % silicon, between 0.1 wt % and 3 wt % styrene, 0.3 wt % and 2 wt % styrene, or about 0.5 wt % styrene, and/or between 0.1 wt % and 5 wt % pigment, 0.2 wt % and 3 wt % pigment, or about 0.5 wt % pigment. For example, the second particulate mineral mix includes about 74 wt % metal particulate, about 13 wt % silicon, about 7 wt % quartz, and about 6 wt % additives. In some embodiments, the second particulate mineral mix does not include quartz or includes less than 1 wt % quartz.

The metal composition of the second particulate mineral mix includes metal material that provides a metal appearance on a surface of the finished slab 50. In an example embodiment, the second region 52 provides the appearance of a metallic vein pattern having one or more metallic widthwise and/or lengthwise veins. Such an appearance can emphasize or exaggerate vein patterns that may be found in quarried stone slabs, and/or create a unique veined or patterned appearance that simulates, but is not found in, quarried slabs. In some embodiments, the metallic vein creates the appearance of flow or movement across the surface of the slab, and can create the impression of a vein pattern formed by molten metal that has cooled and hardened into the visible pattern.

The composition of the metal material in the particulate mineral mix has been found to impact the metallic appearance of the vein or pattern of the second region 52 in the finished slab 50. In some embodiments, the particulate mineral mix includes only a relatively finer metal powder (e.g., 140 US mesh to 400 US mesh or smaller) and does not include larger metal particulate. In some embodiments, the particulate mineral mix includes only a relatively courser metal particulate (e.g., grit of 140 US mesh to 50 US mesh or larger), and does not include finer metal powder. In an example embodiment, the second particulate mineral mix includes multiple metal components having different particle size ranges, such as a relatively finer powder and a relatively courser metal grit. In various example embodiments, the second particulate mineral mix includes between 5 wt % and 45 wt %, between 10 wt % and 30 wt %, or about 15 wt % of a metal powder (e.g., 140 US mesh to 400 US mesh or smaller), and between 20 wt % and 100 wt %, between 30 wt % and 80 wt %, between 50 wt % and 75 wt %, or about 60 wt % of a relatively coarser metal grit (e.g., 140 US mesh to 50 US mesh or larger). Such ranges have been found to promote a distinct metal appearance on a surface of the finished slab.

In an example embodiment, the metal powder includes only a single mesh size between 140 US mesh (e.g. 105 microns) and 400 US mesh (e.g., 37 microns), such as 140 US mesh, 170 US mesh, 200 US mesh, 230 US mesh, 270 US mesh, 325 US mesh, or 400 US mesh. For example, the metal powder is specified/qualified using a single mesh size (e.g., 95% of material is smaller than the specified/qualified mesh size, and in some embodiments may include insignificant amounts of particles outside of the specified/qualified mesh range). Alternatively or additionally, the metal powder includes two or more particle sizes, such as two or more of 140 US mesh, 170 US mesh, 200 US mesh, 230 US mesh, 270 US mesh, 325 US mesh, or 400 US mesh. For example, the metal powder is specified/qualified using multiple mesh sizes (e.g., in each of which 95% of material is smaller than the specified/qualified mesh size).

In an example embodiment, the metal grit is a single particulate size range, such as only a single mesh size. The metal grit has a mesh size of 50 US mesh, 60 US mesh, 70 US mesh, 80 US mesh, 100 US mesh, 120 US mesh, or 140 US mesh. For example, the metal powder is specified/qualified using a single mesh size (e.g., 95% of material is smaller than the specified/qualified mesh size, and in some embodiments may include aesthetically insignificant amounts of particles outside of the specified/qualified mesh range). In some embodiments, the metal grit includes multiple relatively larger mesh sizes, such as two or more of 50 US mesh, 60 US mesh, 70 US mesh, 80 US mesh, 100 US mesh, 120 US mesh, or 140 US mesh, for example. For example, the metal grit is specified/qualified using multiple mesh sizes (e.g., in each of which 95% of material is smaller than the specified/qualified mesh size). In an example embodiment, the specified/qualified size of the metal grit does not overlap with the specified/qualified size of the metal powder and the metal grit is at least 150%, 200%, 250%, 300%, 400%, 500%, or greater than 500% of the specified/qualified size of the metal powder.

A combination of substantial wt % of a relatively finer metal powder with a substantial wt % of a relatively courser metal grit can impart a desired metallic effect of region 52 in the finished slab 50. For example, an overall wt % of greater than 50% metal material that includes a selected ratio of relatively finer metal powder with a relatively courser metal grit can provide a desired metallic sheen. In an example embodiment, the ratio of relatively courser metal grit to relatively finer metal powder in the second particulate mineral mix is between 10:1 and 1:2, 8:1 and 1:1, 6:1 and 2:1, or about 4:1. Such ratios can provide a distinct metallic appearance of region 52 in the finished slab, such as when the metal material is stainless steel, brass, copper, bronze, aluminum, zinc, titanium, gold, silver, iron, magnesium, tungsten, nickel, or tin. In an example embodiment, both the relatively finer metallic powder and the relatively courser metallic grit are a same material type. For example, both the relatively finer metallic powder and the relatively courser metallic grit are stainless steel, both are brass, both are copper, bother are bronze, both are aluminum, both are zinc, both are titanium, both are gold, both are silver, both are iron, both are magnesium, both are tungsten, both are nickel, or both are tin. Alternatively or additionally, the relatively courser metallic grit and the relatively finer metallic powder are different metal types and/or include multiple metal types.

The second particulate mineral mix includes pigment that can impact the aesthetic appearance of region 52, including the color, tonality, etc. In an example embodiment, the second particulate mineral mix 52 includes a pigment that enhances the metal aesthetic appearance of region 52. For example, the pigment of the second particulate mineral mix includes TiO2 pigment. Such a pigment can brighten or lighten the appearance of the stainless steel metal appearance in region 52. In some embodiments, the addition of a TiO2 pigment (e.g., within the wt % described above) can facilitate an aesthetic appearance that is similar or complementary to the appearance of stainless steel fixtures or appliances commonly found in kitchens and living spaces.

In an example embodiment, the metal component(s) of the particulate mineral mix are primarily or entirely stainless steel. Stainless steel particulate has relatively low reactivity with other components of the particulate mineral mix. In use, the appearance of stainless steel (e.g., in region 52) can complement common materials in living/working spaces in which the finished slab is installed, such as stainless steel fixtures and appliances in a kitchen. Alternatively or additionally, stainless steel can facilitate a region 52 that does not significantly change in appearance over the life of the finished slab 50, and can maintain a consistent metallic sheen. Moreover, a region 52 defined predominately by stainless steel particulate is resistant to food products and materials commonly encountered in living and working spaces.

In some example embodiments, the metal component(s) of the particulate mineral mix include brass, copper, bronze, aluminum, zinc, titanium, gold, silver, iron, magnesium, tungsten, nickel, and/or tin. Such materials can be used to provide a distinct appearance (e.g., tonality, sheen, texture, gloss, etc.). Alternatively or additionally, such metals can promote a changing appearance over time. For example, a region 52 defined partly, predominately, or entirely of copper, brass, etc., can develop a patina or weathered look over time, enhancing the aesthetic value and/or uniqueness of the finished slab 50.

In various example embodiments, the first, second, third, and/or other particulate mineral mixes may be predominately metal. For example, first, second, third, and/or other particulate mineral mixes that define regions 51, 52, 53, and/or other regions may have a predominately metal composition (e.g., having a composition as described above with respect to the second particulate mineral mix). In some embodiments, the finished slab 50 has an overall composition that includes a significant metal portion. In various exemplary embodiments, the overall weight percentage of metal of the finished slab 50 is greater than 1 wt %, greater than 2 wt %, greater than 5 wt %, greater than 10 wt %, greater than 20 wt %, greater than 30 wt %, greater than 40 wt %, greater than 50 wt %, greater than 60 wt %, greater than 70 wt %, greater than 80 wt %, greater than 90 wt %, or more. For example, the overall metal composition of the slab is between 5 wt % and 90 wt %, between 5 wt % and 60 wt %, between 10 wt % and 30 wt %, between 20 wt % and 90 wt %, between 30 wt % and 90 wt %, or between 40 wt % and 90 wt %. In some embodiments, the overall wt % of region 52 that defines a metallic vein (e.g., the overall wt % of the second particulate mineral mix in the finished slab) is between 0.5 wt % to 50 wt %, 0.5 wt % to 15 wt %, or 1 wt % to 5 wt %. Such ranges can provide a slab having a significant metal appearance while providing a durable work surface that can be cut and fabricated for installation in a living/work space.

In some examples, the metallic sheen that is visible in veins having a substantial metallic content (e.g., alloy veins) can be characterized in multiple ways. The metallic sheen can be characterized using one or more techniques corresponding to the surface finish of the sample. In some embodiments, such as for slabs having a high gloss finish, a goniophotometer (e.g., RHOPOINT IQ meter available from PHOPOINT INSTRUMENTS) can be used to measure gloss at a predetermined angle and reflectance haze. For example, a goniophotometer is used to measure gloss at a predetermined angle of 20°, 60°, 85°, etc. The metallic sheen of some example alloy veins exhibit a gloss value (measured at an angle of 60°) of 100+ and a reflectance haze greater than 10, in an example embodiment.

In various example embodiments, alloy veins exhibit gloss values and reflectance haze values that are different than non-alloy veins or surfaces. In some embodiments, non-alloy portions exhibit reflectance haze values ranging from between about 1 and about 10, or about 1 and about 8, and/or gloss measurements ranging from about 40 to about 80. In various example embodiments, alloy vein portions exhibit higher gloss and reflectance haze values, such as gloss greater than 80 and/or reflectance haze greater than 15. In various example embodiments, the gloss of the alloy vein is between about 75 and about 250, about 85 and about 225, or about 100 and about 225. Alternatively or additionally, the reflectance haze values of the alloy vein is between about 10 and about 80, about 12 and about 60, or about 15 and about 50. Such values are associated with a distinct metallic surface characteristics and overall appearance.

In some embodiments, such as slabs having a textured finish, a gloss meter (e.g., "BYK-mac i" meter, available from BYK-GARDNER) can be used to measure graininess (S_G), sparkle index (S_i), and sparkle amount (S_a). In various example embodiments, textured alloy veins and textured non-allow veins exhibit graininess (S_G), sparkle index (S_i), and sparkle amount (S_a) that are meaningfully different. Example alloy veins exhibit a sum of S_G, S_i, and S_a, measured at a 15° angle, ranging from about 40 to about 175, about 40 to about 16, or about 50 to about 150. In some embodiments, the sum of S_G, S_i, and S_a, measured at a 15° angle, is greater than 40. Example non-alloy veins exhibit sums ranging from about zero to about 35. In some embodiments, the sum of S_G, S_i, and S_a, measured at a 15° angle, is less than 40.

In various example embodiments, a slab includes alloy veins or portions and non-alloy veins or portions, and the surface characteristics differ at locations of the alloy veins or portions compared to the non-alloy veins or portions. In an example embodiment, a finished stone slab includes a first region (e.g., alloy vein) that exhibits a gloss value (e.g., average gloss value) of between about 75 and about 250, about 85 and about 225, or about 100 and about 225, and a reflectance haze value (e.g., average reflectance haze value) of between about 10 and about 80, about 12 and about 60, or about 15 and about 50. The finished stone slab additionally includes a second region (e.g., non-alloy vein) that exhibits a gloss value (e.g., average gloss value) of between about 40 and about 80, and a reflectance haze value (e.g., average reflectance haze value) of between about 1 and about 10, or about 1 and about 8.

In some implementations, gloss and/or reflectance haze measurements can be performed as a test of finished product. For example, after a slab is cured and finished, a quality control operation is performed that includes measurement of reflectance haze and/or gloss of the slab. The quality control operation can be performed to determine if the slab is within predetermined ranges (e.g., of gloss, reflectance, haze, and/or other characteristics. The quality control operation can be used to qualify a product for sale (e.g., that it is within the predetermined specification for a conforming slab), and/or for categorization purposes (e.g., to group the slabs with other similar slabs have similar gloss/reflectance haze values, to label the slab for sale as a high gloss/reflectance version of the product or to label the slab for sale as a low gloss/reflectance version of the product, etc.). In an example embodiment, multiple measurements are obtained at various locations of the slab, such as at predetermined locations of alloy and non-alloy material, according to a predetermined pattern for the example slab. Measurements obtained for the alloy material locations are compared to specified acceptable alloy ranges, and/or measurements obtained for the non-allow material locations are compared to specified acceptable non-alloy ranges. In some embodiments, a pass/fail determination is made to determine whether the slab conforms to the specified ranges. Alternatively or additionally, measured values are stored and associated with an identifier specifically associated with the measured slab. The measured values are used in one or more subsequent operations, such as to match the measured slab with another slab having similar or complementary values.

Various slabs described herein provide robust strength suitable for installation in living/working spaces in a variety of configurations. In an example embodiment, finished slabs having one or more particulate mineral mixes of significant or predominate metal composition (e.g., as described above) provide a strong and consistent flexural strength across the entirety of the slab. For example, the flexural strength at locations of a second particulate mineral mix defined by significant metal composition is not significantly lower/different than flexural strength at locations of a first particulate mineral mix defined by predominately quartz. Alternatively or additionally, the flexural strength at locations where first and second particulate mineral mixes interface with one another is not significantly lower than locations within a region defined entirely by the first or second particulate mineral mixes. For example, the flexural strength of such regions is within 75%, 80%, 85%, 90%, 95%, or about 100% of one another. A profile of flexural strength across a width or length of the slab is thus relatively consistent, without locations of significant relative weakness. For example, the profile of flexural strength across a width or length of the slab varies by less than 25%, less than 15%, less than 10%, less than 5%, or less.

In an example embodiment, finished slabs having one or more particulate mineral mixes of significant or predominate metal composition (e.g., as described above) exhibit significant structural strength. For example, finished slabs having one or more particulate mineral mixes of significant or predominate metal composition (e.g., as described above) exhibit little to no change in strength between material cross sections with and without a metallic vein. Structural strength of alloy and non-alloy slabs can be characterized using a three-point flexural test. For example, structural strength can be characterized based on a modulus of rupture (MOR) (e.g., determined according to ATSM International C99/C99M—18 "Standard Test Method for Modulus of Rupture of Dimension Stone" (2018).

In an example embodiment, 12"×12"×2 cm finished slab portions having single alloy vein running in a straight line across the center is divided into five equally sized specimens by cutting across the alloy vein, with the alloy material at the expected modulus of rupture (MOR) breaking point (e.g., the center of a 3-point bending span). All five specimens are tested in accordance with the ATSM International C99/C99M—18 "Standard Test Method for Modulus of Rupture of Dimension Stone". In an example embodiment, the average MOR for the five alloy veined specimens was 9.99±0.22 ksi. Tests of similar, but non-veined, specimens showed that the average MOR outside the alloy vein was 10.45±1.50 ksi. Based on a comparison of these results, the specimens exhibited only an approximate 4.53% strength difference between alloy-veined and non-veined areas. MOR values for both the alloy-veined and non-veined examples were significantly higher than MOR of 4.00 ksi, which in some examples can be a standard MOR for a hardened slab product suitable for use in living or working spaces (e.g., along a countertop, table, floor, or the like).

Figure 2:
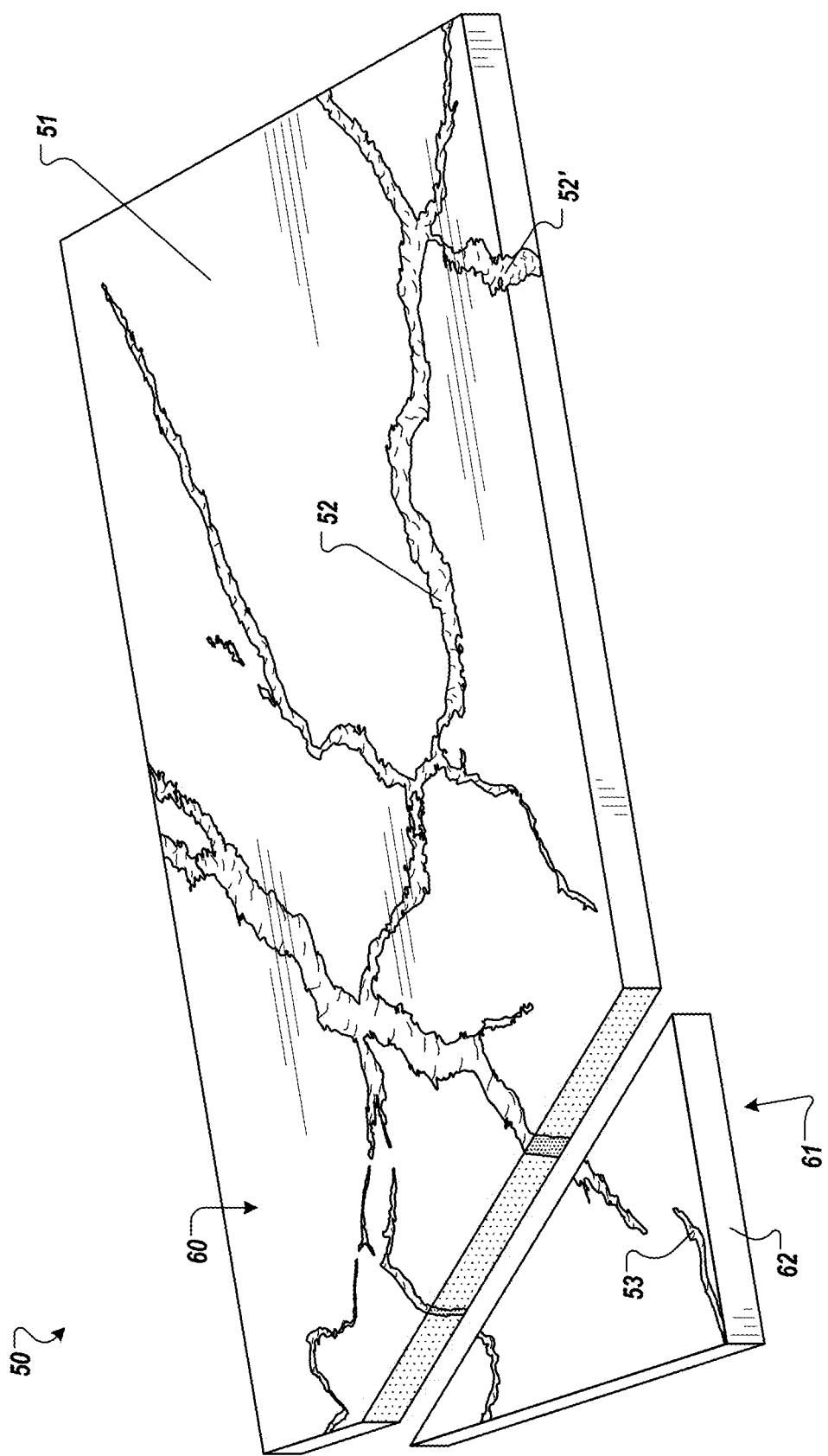
FIG. 2 is a perspective cross-sectional view of the example processed slab, in accordance with some embodiments.

As shown in FIGS. 1 and 2, exemplary regions 51, 52, and 53 have thicknesses that extend entirely through the thickness T of the slab 5. Such thicknesses can provide an appearance in which the pattern defined by the particulate mineral mixes are visible through the entire thickness T of slab 50 along periphery edges, such as when slab 50 is cut for installation.

The finished slab 50 has a major surface 60 having various aesthetic and tactile features and characteristics. In an example embodiment, one or more of regions 51, 52, 53, have an aesthetic appearance and/or tactile characteristic that differs from another of region 51, 52, 53 (e.g., as described in additional detail with reference to FIGS. 3-11). Alternatively or additionally, the entire major surface has a consistent texture (e.g., consistent smooth, glossy surface) that differs in aesthetic characteristics between regions 51, 52, and/or 53, such as different color, tonality, visible particle size/shape, etc. For example, both regions defined by a predominately quartz particulate mineral mix (e.g., region 51) and regions defined by predominately metal particulate mineral mixes (e.g., regions 52 and/53) having a consistent smooth, glossy surface, as illustrated in FIG. 2.

Figure 3:
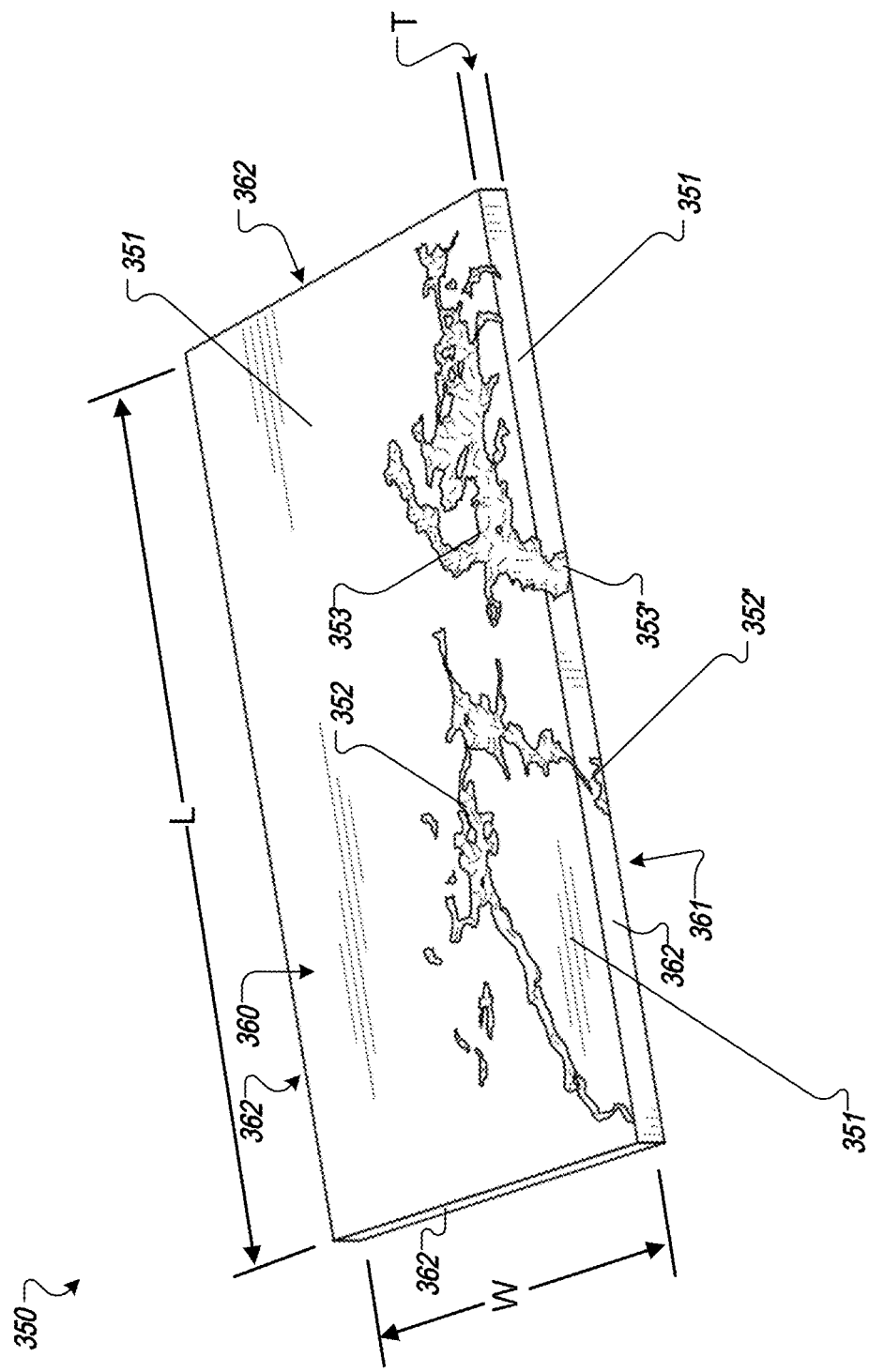
FIG. 3 is a perspective view of an example processed slab, in accordance with some embodiments.

Referring to FIG. 3, another example processed slab 350 is shown having a first region 351 of a primary or background fill and second and third regions 352, 353 that include striations or veins (e.g., according to a predefined pattern). In various example embodiments, example processed slab 350 includes one or more features described above with reference to example slab 50.

One or more of a top major surface 360, a bottom major surface 361, and/or edges 362 have a tactile and/or visible texture. For example, the primary fill 351, region 352, and/or region 353 have surface features that differ in one or more respects. In an example embodiment, the regions 352 and 353 are recessed below or raised above the average thickness of the processed slab. Alternatively or additionally, the regions 352 and 353 have a surface characteristics or texture that differs compared to primary or background fill 351, such as a different roughness (or smoothness), gloss, or other tactilely perceptible difference.

In various example embodiments, slab 350 includes any number, combination, pattern, and/or proportion of particulate fills and mixes. For example, the processed slab 350 can include two, three, four, five, ten, or any appropriate number of particulate mineral mixes to provide any appropriate number of regions (e.g., different perceptible patterns/veins). In another example, the primary fill 351 may not occupy a majority of the processed slab 350 (e.g., the processed slab 350 may include a substantially continuous collection of regions without any one of the particulate fill types occupying an identifiably primary or major portion of the volume of the processed slab 50). In some embodiments, processed slab 350 includes one or more regions 351, 352, 353 of different particulate mineral mixes and/or different surface characteristics (e.g., according to a predefined pattern).

The processed slab 350 has a width W and a length L (e.g., at least 2 feet wide by at least 6 feet long, and between about 3 feet and 5 feet wide and between about 6 feet and 14 feet long, preferably about 4.5 feet wide (more particularly, about 140 cm wide) by about 10 feet long (more particularly, about, 310 cm long)). In general, the length L and the width W define a top major surface 360 (e.g., face) and a bottom major surface (e.g., face) 361. The processed slab 350 also has a thickness T between the top major surface 360 and the bottom major surface 361. The periphery of the processed slab 350 includes a collection of edge faces 362.

Each slab 350 can comprise a quartz material and/or other particulate mineral material that, when mixed with pigments and a resin binder and subsequently compressed and cured, provides a hardened slab product suitable for use in living or working spaces (e.g., along a countertop, table, floor, or the like). As shown in FIG. 3, each slab 350 may be formed from a combination particulate mineral mixes that have different hardnesses and/or resistances to abrasion, and optionally different colors and textures. The particulate mineral mixes are arranged in a slab mold (e.g., slab mold 730 shown in FIG. 7), to provide the predetermined regions of selected striations/veins and/or other patterns. In some embodiments, the patterns may be generally repeatable for each separately molded slab, for example by dispensing different particulate mineral mixes (e.g., different hardnesses, different resistance to abrasion, different pigments, different mineral compositions, different additives) according to predefined and repeatable dispensation pattern into the mold until filled. The mold is closed and then transported for compaction, curing, abrading, and other operations.

As shown in FIG. 3, the pattern of regions 351, 352, and 353 provide a surface appearance having one or more veins or other visible features. In some embodiments, veins 352 and 353 extend at least partly across the major surfaces 360, 361 and/or the edges 362 (the thickness T). For example, slab 350 can include a widthwise vein that extends partly or entirely in a generally widthwise direction, a lengthwise vein that extends partly or entirely in a generally lengthwise direction. Alternatively or additionally, one or more veins extend in angled or varying directions partly or entirely across the length L and/or width W of the processed slab 350. In some embodiments, the veins also extend partly (such as vein 352') or entirely (such as vein 353') through the thickness of the processed slab 350 (e.g., thereby providing a vein appearance even when the slab is cut and edged to specific shapes in living or working space, such as along a countertop, table, floor, or the like). In some embodiments, each processed slab 350 in a set of separately molded slabs can include the regions of different particulate mineral mixes dispensed into the mold (e.g., such as mold 730 shown in FIG. 7) according to predefined and repeatable dispensation patterns, such that multiple slabs 350 in the set of separately molded slabs can have substantially the same appearance to one another.

The different mixes can be compaction molded and cured in the mold so as to provide the hardened slab 350. One or more of the mixes that are used to form the composite stone material can include organic polymer(s) and inorganic (mineral) particulate component. The inorganic (mineral) particulate component may include such components as silicon, basalt, glass, diamond, rocks, pebbles, shells, a variety of quartz containing materials, such as, for example, but not limited to: crushed quartz, sand, quartz particles, and the like, or any combination thereof. In this embodiment, all four different particulate mineral mixes each comprise a quartz material as a predominant component, which may include sand of various particle sizes and of different combinations. Alternatively, one or more particulate mineral mixes (e.g., that define one or more of regions 351, 352, 353, etc., include little or no quartz, such as less than 50 wt % quartz, less than 40 wt % quartz, less than 30 wt % quartz, less than 20 wt % quartz, less than 15 wt % quartz, less than 10 wt % quartz, less than 5 wt % quartz, less than 1 wt % quartz, or no quartz. Such composition can provide an appearance that emphasizes characteristics of one or more different components of the particulate mineral mix, such as a metal appearance. Alternatively or additionally, such composition can create a substantially different appearance between two or more of the particulate mineral mixes that make up slab 50, such as different appearances between a first particulate mineral mix that is predominately quartz and a second particulate mineral mix that is predominately metal.

In the hardened, cured form of the slab 350, the organic and inorganic materials can be linked using a binder, which may include for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. Some or all of the mixes dispensed in the mold may include components that are combined in a mixing apparatus prior to being conveyed to the mold. The mixing apparatus can be used to blend raw material (such as the quartz material, organic polymers, unsaturated polymers, and the like) at various ratios. For example, some or all of the mixes dispensed in the mold 730 may include about 8-95% quartz aggregates to about 5-15% polymer resins. In addition, various additives may be added to the raw materials in the mixing apparatus, such additives may include metallic pieces (e.g., copper flecks or the like), colorants, dyes, pigments, chemical reagents, antimicrobial substances, fungicidal agents, and the like, or any combination thereof. In alternative embodiments, some or all of the quantity of quartz aggregates (mentioned above) can be replaced with or include porcelain and/or ceramic aggregate material.

The regions 351, 352, and 353 each have a different hardness and/or resistivity to abrasion when cured and hardened. In some embodiments, the differences in hardness and/or resistivity to abrasion can be due to differences in the properties and characteristics of the different particulate mineral mixes used in the formation of the slab 350, including particulate composition (e.g., quartz content, other mineral content, particulate size), binder content, pigment content, average particle size, average particle hardness, and/or average particle brittleness. In various example embodiments, one or more of the particulate mineral mixes has relatively higher percent volume of quartz compared to one or more of the other particulate mineral mixes. For example, the first particulate mineral mix (e.g., locations of primary fill 51) has a percent volume of quartz (Q1) between 50% and 95%, 65% and 85%, or about 75%. The second particulate mineral mix (e.g., locations of veins 52 and 53) has a percent volume of quartz (Q2) that is less than the percent volume of quartz of the first particulate mineral mix.

In various example embodiments, Q2 is between 0% and 95%, 60% and 90%, or about 80% of Q1. In various example embodiments, Q2 is between 1% and 95%, 2% and 30%, 3% and 20%, or about 15%. Alternatively or additionally, other components of the particulate mineral mix can be controlled to provide different characteristics of the respective mineral mixes in the hardened slab. For example, in some embodiments, the first particulate mineral mix includes between 70% and 80% volume of quartz, between 0% to 10% volume of pigment, and between 10% and 20% volume resin binder. The second particulate mineral mix includes between 50% and 70% volume of quartz, between 10% and 30% volume pigment, and between 5% and 30% resin binder. Alternatively or additionally, in some embodiments, the first particulate mineral mix includes between 50 wt % and 80% wt % quartz and the second particulate mineral mix includes between 0 wt % and 20 wt % quartz and greater than 50 wt % metal material (e.g., a significant metal composition such as described above with reference to FIGS. 1-2). In some embodiments, one or more pigmentation layers may be applied over and/or between the particulate mineral mixes. For example, some pigmentation layers may include relatively low volumes of quartz (e.g., between 5% and 30%) and relatively high volumes of pigment (e.g., between 10% and 30%) and/or resin binder (e.g., between 50% and 70%). Such relative compositions of first and second particulate mineral mixes facilitate different response to abrasion operations that facilitates a finished surface having regions of distinct texture, gloss, thickness, and/or other perceptible surface characteristics associated with locations of the respective particulate mineral mixes. In some embodiments, various mineral particulate components are included, such silicon, basalt, glass, diamond, rocks, pebbles, shells, a variety of quartz containing materials, such as, for example, but not limited to: crushed quartz, sand, quartz particles, and the like, or any combination thereof, to facilitate a predetermined response to abrasion operations.

The metal composition of one or more particulate mixes can be selected to affect a hardness of the cured slab 350 in a region defined by the particulate mineral mix. In an example embodiment, one or more particulate mineral mixes includes predominately metal, such as greater than 50 wt % of stainless steel material. Such a composition can provide a region that has relatively lower hardness and/or less resistance to abrasion in the hardened slab 50, as compared to regions defined by particulate mineral mixes having a relatively high quartz composition.

In some embodiments, the regions 351 can define a majority of the major surface 360, and regions 352 and 353 can define one or more veins extending at least partly across the major surface 360. For example, the primary fill can occupy the regions 351 within the slab 350, and other particulate mineral mixes form the regions 352 and 353, which extend partly or entirely across the surfaces and edges of the slab 350.

In some implementations, substantially the entire major surface 360 can be abraded substantially uniformly. For example, the same type and duration of abrasion can be applied across the entire major surface 360 (e.g., causing substantially all of the primary fill exposed at the major surface 360 in the regions 351 to erode to substantially the same average depth, and causing the regions 352 and 353 to each erode to their own respective average depths across the entire major surface 360).

In some implementations, the first set of regions can have a first texture and the second set of regions can have a second texture different from the first texture. For example, the region 351 may have a smooth, glossy texture, while the regions 352 and/or 353 may have a relatively rougher, matte texture.

Figure 4:
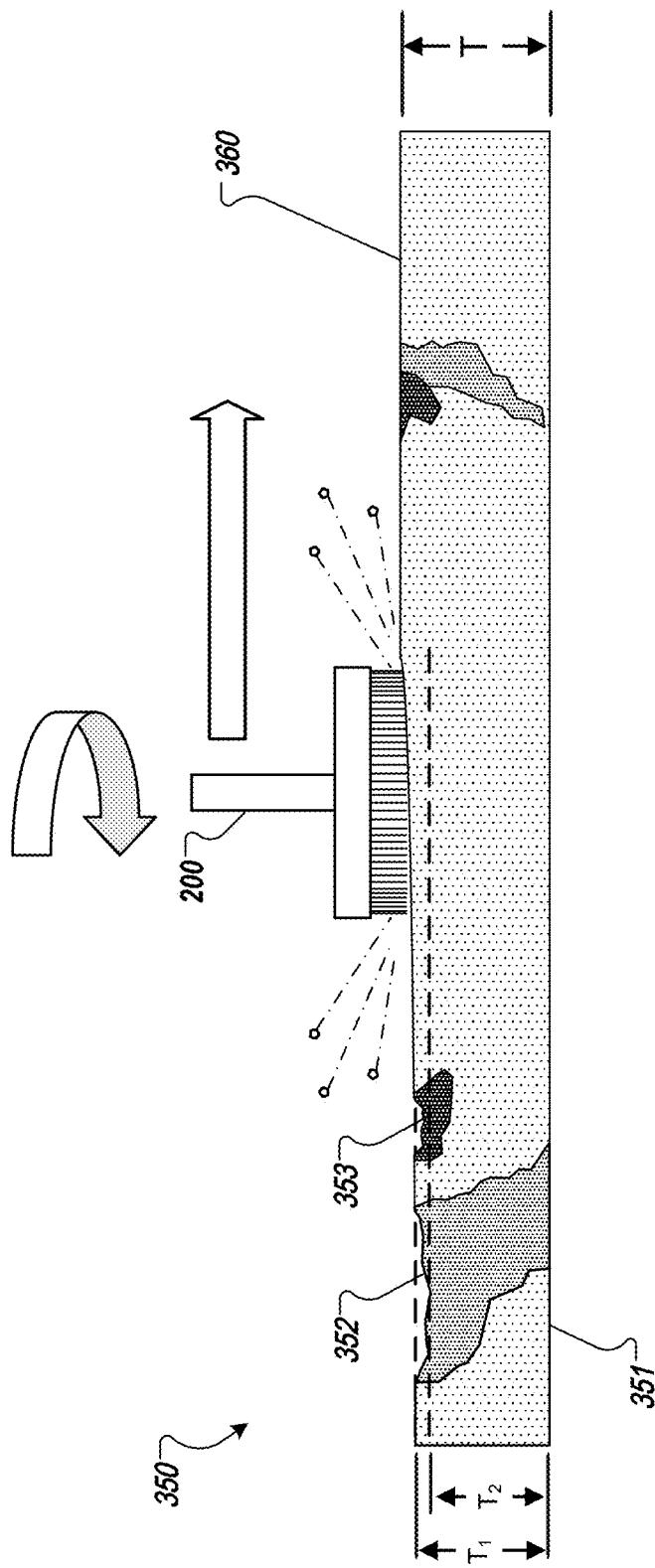
FIG. 4 is a side view of an example processed slab undergoing an example surface treatment process, in accordance with some embodiments.

FIG. 4 is a side view of the processed slab 350 undergoing an example surface treatment process. An abrasive brush 200 abrades substantially all of the top major surface 360 of the processed slab 350 to expose a processed face. For example, the abrasive brush 200 applies the same abrasion (e.g., same abrasion parameters) over the entire top major surface 360 without distinction between regions of different particulate mineral mixes (e.g., regions 351, 352, 353). As the abrasive brush 200 is rotated and drawn across the top major surface 360, a small amount of the processed slab 350 at the top major surface 360 is removed.

The primary fill 351, the veins 352, and the veins 353 are formed from different mineral particulate mixes having different physical characteristics, such as different cured hardnesses, textures, material composition (e.g., predominately metal, predominately quartz, etc.) and/or resistances to abrasion in the processed slab 50. As such, the primary fill 351, and the veins 352 and 353 define different regions of different cured harnesses, textures, or resistances to abrasion across the top major surface 360. When subjected to abrasion by the abrasive brush 200, the primary fill 351, the vein 352, and the vein 53 erode or otherwise react to the abrasion at relatively different rates and/or in different manners.

In an example embodiment, the veins 352 and 353 are relatively susceptible to the abrasion of brush 200 and relatively more material is removed at locations of veins 352 and 353 as compared to region 351 (e.g., during each pass of brush 200 and/or over the course of an entire abrading operation). In an example embodiment, the veins 352 and/or 353 are defined by a particulate mineral mix of predominately metal and relatively less or no quartz. For example, the vein 352 erodes to an average thickness $T_2$ and the primary fill 351 erodes to an average thickness $T_1$. In some embodiments, the major fill 351 can be relatively less resistant to abrasion than the veins 352, 353, to provide a substantially inverse effect (e.g., with the primary fill having an average thickness $T_2$ and the veins 352, 353 having an average thickness $T_1$). As such, after abrasion, the major top face 360 has a thickness that varies between locations of primary fill 351 and veins 352 and 353 (e.g., relative to an average thickness of the processed slab), and includes peaks, valleys, and plateaus that can be felt and/or seen. In some embodiments, the resulting texture can have a matte finish appearance and/or texture, a gloss finish appearance and/or texture, or combinations of both (e.g., a primarily glossy surface with matte textured veins running across it).

In some implementations, abrading the major surface 360 of the cured slab 350 can include abrading by at least one of an abrasive brush and mechanical application of an abrasive fluid compound. For example, the example abrasion brush 200 can be used to apply a fluid compound containing abrasive material to the major surface 360.

In some implementations, each of the textures can be defined by one or more of roughness, gloss, and average thickness extending perpendicular to the slab width and the slab length. For example, the region 351 and the regions 352, 353 can each be made up of mineral particulate mixes that each have particles that are more rounded or more faceted in shape, or have particulates or binders that have relatively different in terms of light absorption and reflectivity, or exhibit relatively different levels of receptivity to polishing. In another example, as described above, the texture can be defined by some areas having different thicknesses than others (e.g., the example veins 352, 353 have an example thickness of $T_2$ whereas the example primary fill has an example thickness of $T_1$, resulting in boundaries where the transitions between the different thicknesses can be felt or seen).

One or more different characteristics of the particulate mineral mixes that define regions 351, 352, 353, and/or different surface treatments of regions 351, 352,353, yields one or more perceptible differences in the finished slab. In an example embodiment, one or more regions can be characterized by reflectivity. Reflectivity is measured under defined conditions to identify direct reflection, diffuse reflection, and total reflection values. For example, a surface location of the slab (e.g., a location on region 352) is illuminated by a predefined light source at a predefined angle of incidence, such as 15 degrees, 30 degrees, 45 degrees, etc. The reflected light is measured and quantified, including direct, diffuse, and total reflectance, for example. The resulting values provide an indicator of the magnitude of the reflected light, as well as whether light is reflected evenly in many directions, intensely focused in certain directions (e.g., providing a quantifiable "sparkle" effect), etc.

In an example embodiment, region 352 (e.g., defined by a particulate mineral mix having a high metallic content) exhibits a relatively high direct reflectivity and/or diffuse reflectively (e.g., while also having a textured/non-smooth surface). The relatively high reflectivity (e.g., relatively high diffuse reflectivity) can represent a relatively high metallic sheen, luster, and/or intensity. In an example embodiment, region 352 is defined by a first (e.g., average) diffuse reflection and a second (e.g., average) direct reflection.

In some embodiments, the reflection values provide a numeric indicator of relative similarity/difference. For example, reflectivity (e.g., direct, diffuse, and/or total) differ between regions 351, 352, 353, based on the surface texture and characteristics of the materials that define these regions. A smooth, glossy surface can exhibit a relatively higher direct reflection and/or relatively lower diffuse reflection. A textured, metallic surface can exhibit a relatively higher diffuse reflection.

Alternatively or additionally, reflectivity (e.g., direct, diffuse, and/or total) provides a metric to qualify a set of slabs having the same characteristics. For example, the systems, materials, and processes described herein facilitate manufacturing of a set of slabs having a predefined pattern and appearance. Reflectivity of one or more of regions 351, 352, 353, of slabs of a same type having the same predefined pattern have reflectivity values (e.g., at a same location on the slab/within a same region 351, 352, 353) that are consistent (e.g., without 15%, within 10%, within 5%, within 2%, etc.) of one another.

Figure 5A:
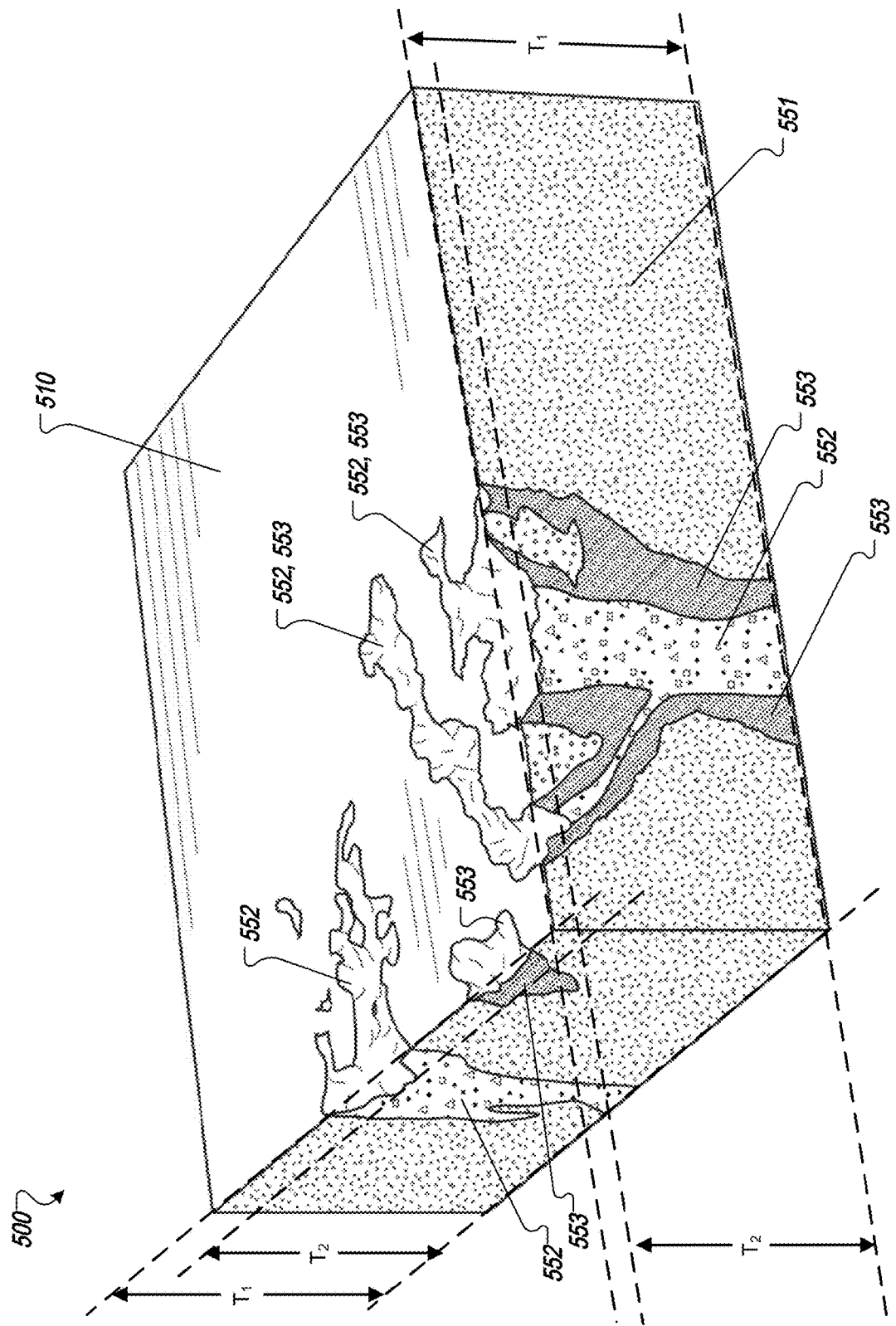
FIGS. 5A and 5B are enlarged sectional perspective views of example processed slabs, in accordance with some embodiments.
Figure 5B:
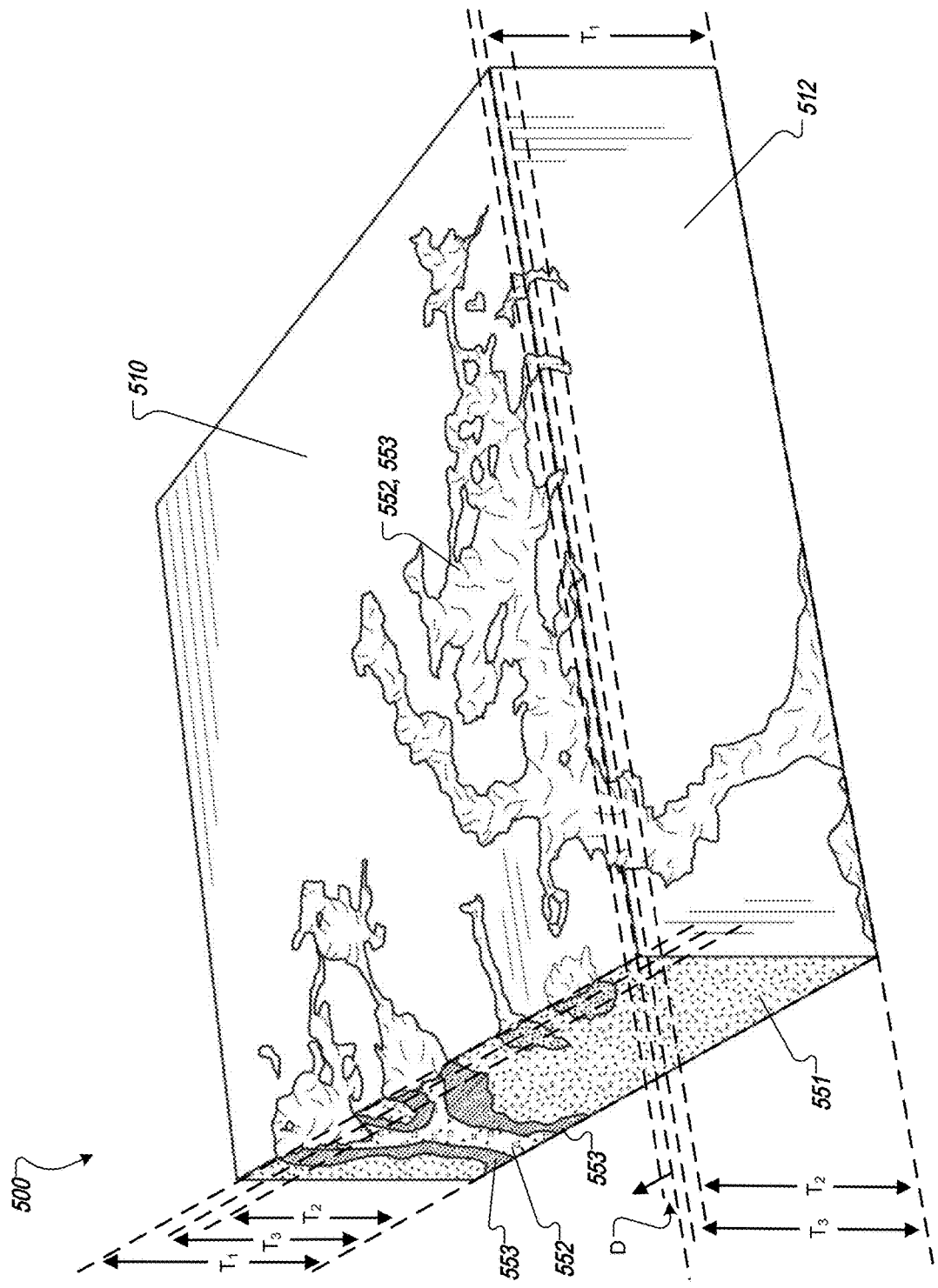

FIGS. 5A and 5B are enlarged sectional perspective views of example processed slabs. In various example embodiments, slab 500 may include one or more features of slab 50 and/or 350 described above with reference to FIGS. 1 through 4.

The slab 500 has a major surface (or face) 510 that is generally defined by an average thickness $T_1$ of a primary fill 551 (e.g., a particulate mix that makes up a majority of the volume of the slab 500). A collection of veins 552 and a collection of veins 553 extend partly and/or entirely across the major surface 510 and/or through the thickness of the slab 500. The veins 552 are recessed below the major surface 510 to an average thickness $T_2$, and the veins 553 are be recessed below the major surface 510 to an average thickness $T_3$ that is different from $T_1$ and/or $T_2$. The difference between the thicknesses $T_1$ and $T_2$ provide the major surface 510 with a three-dimensional texture that can be felt and/or seen. In various example embodiments, the difference between $T_1$ and $T_2$ is in a range between 0.01 mm and 10 mm, 0.1 mm and 2 mm, or about 0.5 mm. In some embodiments, the rear major surface of slab 500 is substantially flat across primary fill 551, and veins 552 and 553, and an average depth of the veins 552, 553 below the major surface 510 is approximately equal to the difference between $T_1$ and $T_2$.

In the illustrated example, the veins 552 and 553 are made of two different particulate mineral mixes in addition to the primary fill 551, such that the slab 500 include first, second, and third particulate mineral mixes that each differ in one or more characteristics. For example, first particulate mineral mix includes predominately quartz and second and/or third particulate mineral mixes include predominately metal. Alternatively or additionally, slab 500 may include two, three, or more than three particulate mineral mixes that each differ in one or more characteristics.

Referring to FIG. 5B, the slab 500 is shown with an exposed edge face 512 (e.g., a side edge defined by the thickness of the slab 500 visible in the finished slab 500). Some of the veins 552, 553 extend along the major surface 510 and are visible over the corner of the slab 500 to extend at least partly along the exposed edge face 512. The veins 552, 553 at the edge face 512 are recessed to an average depth D away from the edge face 512, providing the edge face 512 with a three-dimensional texture that can be felt and/or seen. In some embodiments, the three-dimensional texture can enhance other distinctions between the regions 531, 532, and/or 532. For example, the three-dimensional enhances the visual distinction between a predominately quartz appearance of the region 551 and a metal appearance (e.g., having a metallic sheen) of the second and/or third regions 532, 533.

Figure 6:
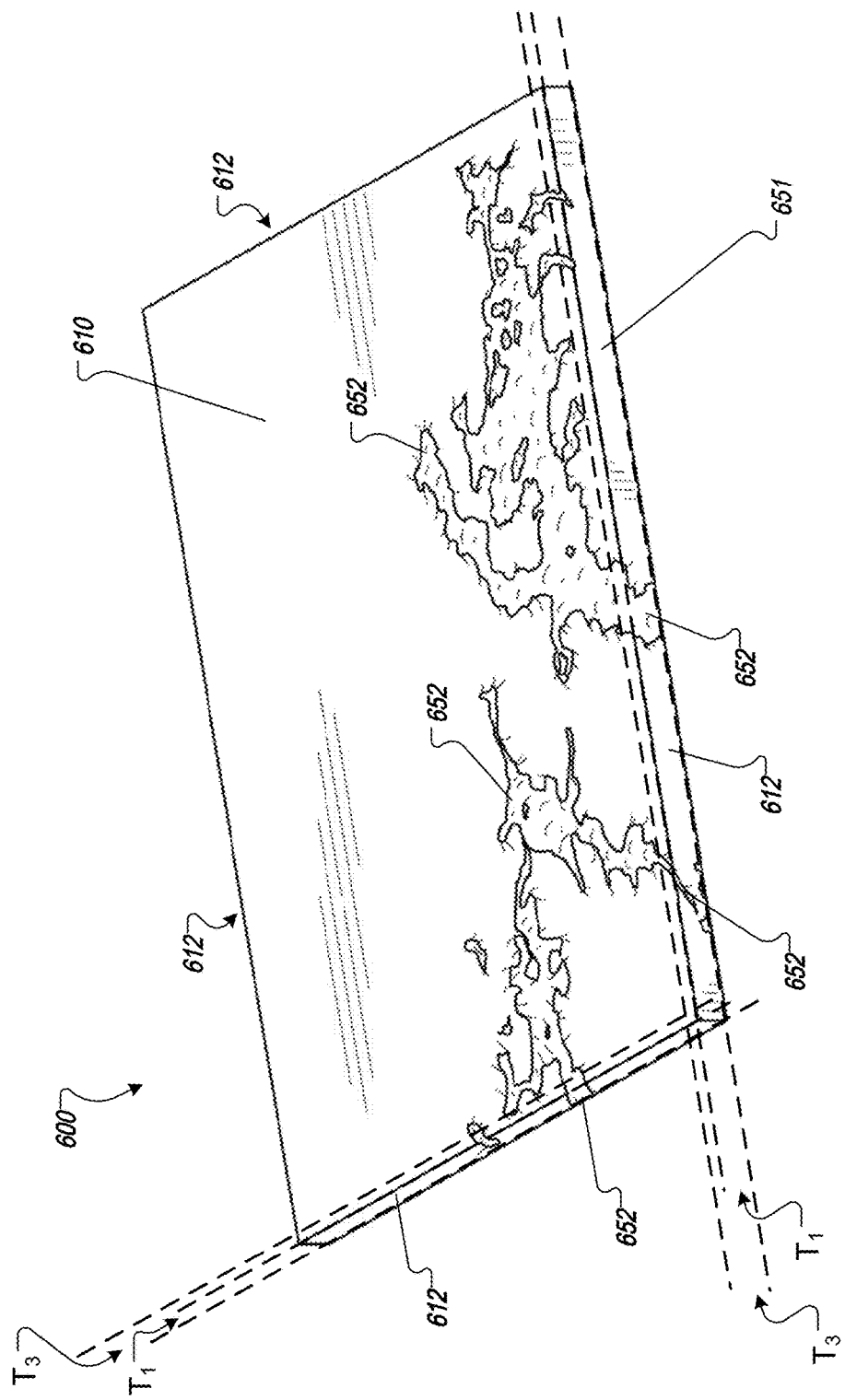
FIG. 6 is an enlarged perspective view of an example processed slab, in accordance with some embodiments.

FIG. 6 is an enlarged perspective view of an example processed slab 600. In various example embodiments, processed slab 600 may include one or more features of slabs 50, 350, and 400 described above with reference to FIGS. 1-5. The slab 600 has a major surface (or face) 610 that is generally defined by an average thickness $T_1$ of a primary fill 651 (e.g., a particulate mix that makes up a majority of the volume of the slab 600). A collection of regions 652 (e.g., veins) extend partly and/or entirely across the major surface 610 and edge faces 612 of the slab 600. The regions 652 project outward from the major surface 610 and the edge face 612 to an average thickness $T_3$. The difference between the thicknesses $T_1$ and $T_3$ provide the major surface 610 and the edge faces 612 with three-dimensional textures that can be felt and/or seen. The regions 652 are made of at least one particulate mineral mix that differs from the particulate mineral mix of primary fill 651.

Figure 7:
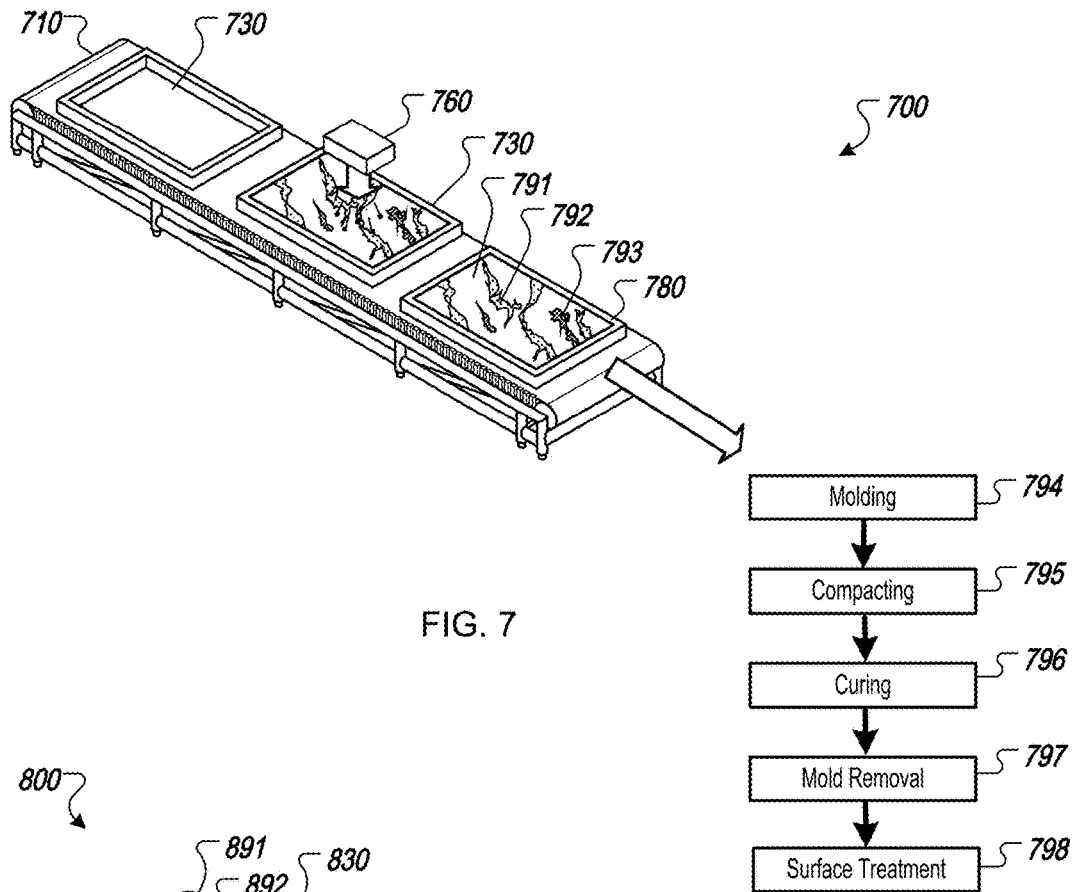
FIG. 7 is a diagram of an example system for forming a processed slab product, in accordance with some embodiments.

Referring now to FIG. 7, a diagram of an example system 700 for forming a processed slab product is shown. In some embodiments, the system 700 for forming a set of processed slab products (e.g., slabs 50, 350, 500, 600 in FIGS. 1-6) is configured to dispense particulate mineral mixes (e.g., that are differently resistant to abrasion when formed into the cured slab) into the slab molds 730. The slab molds 730 are then advanced to a subsequent compression molding operation (e.g., vibrio-compaction molding, curing, etc.). The system 700 includes a conveyor 710. A collection of slab molds 730 are transported on the conveyor 710. The slab molds 730 provide a form for processed molded slab products that are at least three feet wide and at least six feet long, and about 4.5 feet wide by about 10 feet long, for example.

The conveyor 710 transports the slab molds 730 to a dispenser 760 (e.g., a mineral aggregate distributor). In the illustrated example, the dispenser 760 is configured to release different particulate mineral mixes (e.g., different cured resistances to abrasion, different textures, different pigments, different mineral compositions, different additives, or a combination thereof). In some embodiments, multiple dispensers 760 may be used (e.g., each dispenser configured to dispense different particulate mineral mix or combination of mixes).

The slab mold 730 receives the different mineral mixes (comprising mostly a quartz material as described above) from the dispenser(s) 760. For example, the dispenser 760 can be configured with a shutter or valve apparatus that is controllable to regulate the flow of particulate mineral mix from the dispenser 760 for input to the slab mold 730. In some embodiments, the dispensing heads (or other inputs for distributing the particulate mineral mixes to the slab mold 730) can be controlled according to a predetermined control algorithm so as to define successive layers or regions of the different particulate mineral mixes for dispensation into the slab mold 730. In the illustrated example, the slab mold 730 is filled with a primary fill 791 and two other different types of particulate mineral mixes to create two different types of patterns such as a vein 792 and a vein 793.

In some examples, multiple dispensers 760 can be used to dispense different particulate mixes into different regions of the slab. The slab may be formed from a number of different particulate mineral mixes, such as between 2 and 20 different particulate mineral mixes (e.g., and the system includes a corresponding number of dispensers 760 or a single dispenser 760). In some examples, the number of dispensers 760 can correspond equally to the number of differently pigmented particulate mineral mixes used to create the slab product.

The filled molds 780 are then moved to one or more sequent stations in the system 700 for forming the hardened slab. For example, each of the filled molds 780 can continue to a subsequent station in which a top mold attachment 794 is positioned over the filled mold 780 so as to encase the layers of particulate mineral mixes between the slab mold 730 and a top cover mold piece. From there, the filled mold 780 (e.g., including the top cover mold piece) advances to a subsequent station in which a vibro-compaction press 795 applies compaction pressure, vibration, and/or vacuum to the contents inside the filled mold 780, converting the particulate mixes into a rigid slab. The filled mold is subjected to a curing station 796 in which the material used to form the slab (including any resin binder material) are cured via a heating process or other curing process, strengthening the slab inside the filled mold 780. In an example embodiment, the contents of the filled molds are initially uncured. For example, each of the plurality of particulate mineral mixes within the filled molds include uncured resin binder. The particulate mineral mixes are contemporaneously subjected to pressure, vibration, vacuum, and/or heat in order to contemporaneously harden/cure each of the particulate mineral mixes to form the finished slab. For example, the filled mold does not include some portions of previously hardened/cured particulate mineral mixes and a vein pattern defined by an unhardened/unhardened particulate mineral mix.

After the slab is fully cured (and, optionally, after the slab is cooled), the slab mold 730 and the top mold cover piece are removed from the hardened and cured slab at a mold removal station 797. The slab mold 730 is then returned to the conveyor 710. The hardened and cured slab is moved to a surface treatment station 798, in which a major surface of the slab is abraded, to reveal a complex abraded surface having a predetermined texture and pattern. In some embodiments of the system 700, the abraded or otherwise exposed major surface of each of the processed molded slabs can provide an outer appearance that is substantially repeatable for the other slabs (from the other filled molds 780 in FIG. 7).

Figure 8:
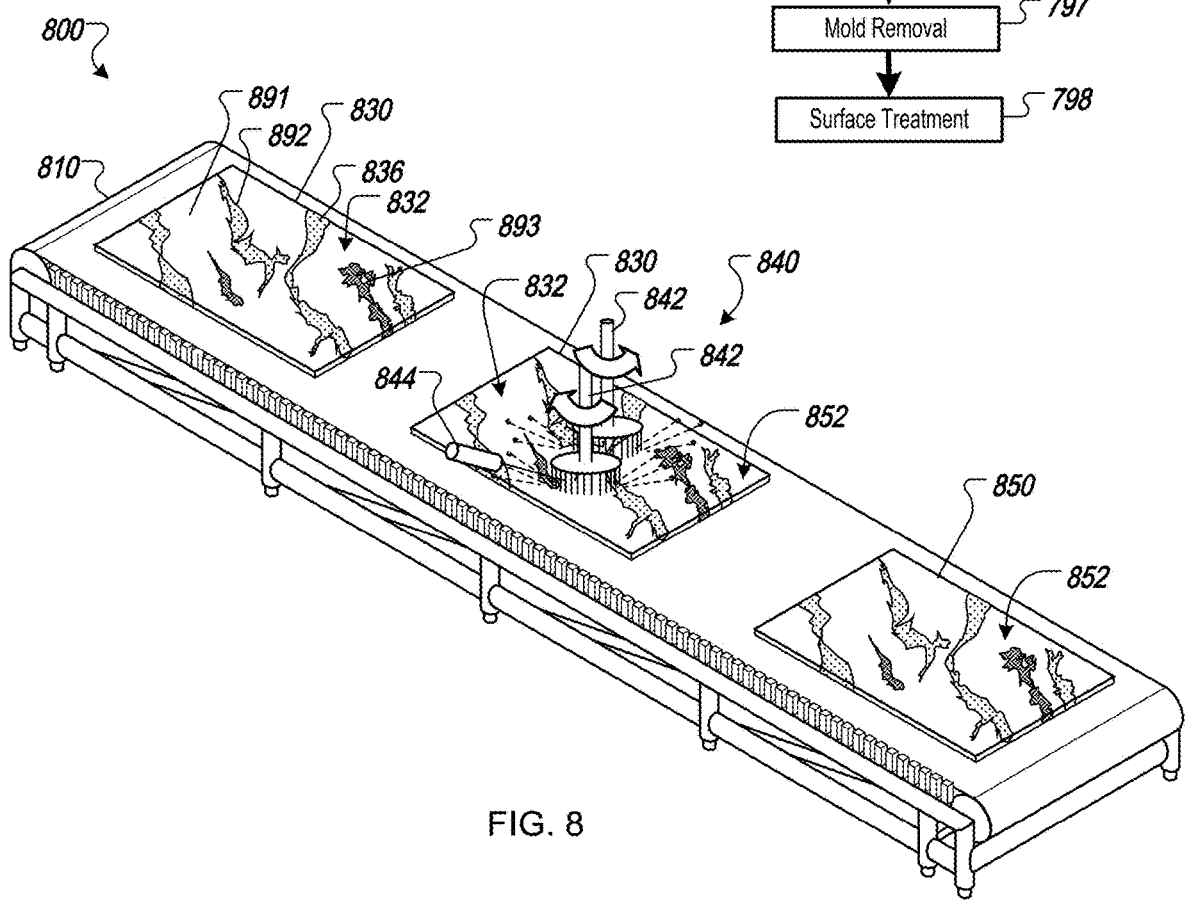
FIG. 8 is a diagram of an example system for applying a surface treatment to texturize a processed slab product, in accordance with some embodiments.

FIG. 8 is a diagram of an example system 800 for applying a surface treatment to texturize a processed slab product (e.g., a face treatment apparatus), in accordance with some embodiments. In some embodiments, the system 800 is included in the example surface treatment station 798 of FIG. 7. The system 800 is configured to modify at least a portion of at least one face of a cured and hardened processed stone slab by abrading the slab to reveal visible and/or tactile differences in the depth and/or roughness of different materials exposed at the processed face(s).

A collection of hardened and cured slabs 830 (e.g., the hardened and cured slabs removed at the example mold removal station 797) are transported on a conveyor 810 to a surface treatment station 840. The hardened and cured slabs 830 include a primary fill 891 (e.g. the primary fill 51 of the example slab 50, the primary fill 791 after it has been cured and hardened, etc.), and/or one or more regions 892 and 893. In an example embodiment, the primary fill 891 is made of a first particulate mineral mix that differs in one or more characteristics as compared to second and third particulate mineral mixes 892, 893. For example, the hardness, brittleness, resistance to abrasion, and/or other characteristics differs between the first particulate mineral mix compared to the second and/or third particulate mineral mix.

The surface treatment station 840 modifies a major surface 832 of the hardened and cured slabs 830. For example, the surface treatment station 840 includes one or more abrasive brushes 842 configured to contact the major surface 832 vertically and rotate about a rotational axis arranged substantially perpendicular to the major surface 832. The one or more abrasive brushes 842 rotate in contact with the major surface 832 as they are drawn across the major surface to provide substantially the same amount (e.g., duration) of abrasion to all areas of the major surface 832. In an example embodiment, the movement of the one or more brushes 842 across the major surface 832 is independent of the region of the slab (e.g., independent of whether the brush is in contact with 891, 892, 893). One or more abrasive fluid compound applicators 844 can be used to apply abrasion promoters and/or water to the areas being treated to modify the action of the abrasive brushes 842, to control the temperature of the process, and/or to reduce the production of dust. The selection of brush type, vertical pressure, rotational speed, lateral direction, lateral pattern, abrasive grit, water flow, and slab advancement speed can all be controlled to further control the abrasion process. In some implementations, the abrasion process may be applied evenly to provide a uniform level of abrasion, or it may be applied unevenly across the major surface 832 to provide an intentionally non-uniform level of abrasion. In various example embodiments, the one or more abrasive brushes include silicon carbine, diamond, or other abrasive brushes such as diamond abrasive brushes available from Tenax USA of Charlotte, NC In some embodiments, a series of brushes having differing abrasive grit ratings are used in sequence. In some embodiments, abrasive brush application pressures are between 0.5 bar to above 8.0 bar, between 0.8 bar to 4 bar. In some examples, the abrasive brushes 842 can be spun at speeds ranging from 200 RPM to 1500 RPM, 300 RPM to 1200 RPM, or between 400 RPM to 550 RPM. In some implementations, water is applied to the abrasion site at flow rates ranging from zero to 4 gallons per minute or more. In some embodiments, the abrasive brushes 842 are advanced across the major surface 632 at speeds ranging from below 9000 to above 18000.

As the abrasive brushes 842 abrade the major surface 832, small amounts of the major surface 832 are removed to provide a processed major surface 852 of a processed stone slab product 850. The particulate mineral mixes in regions 891, 892, 893, abrade at different rates and/or in different manners (e.g., based on different hardness, particle size, resistance to abrasion, etc.).

In some example embodiments, the primary fill 891 is harder and/or more abrasion-resistant than the veins 892, 893 such that the areas of the veins 892, 893 exposed at the major surface 832 (e.g., face areas) recede below a plane generally defined by the primary fill 891. The resulting processed slab has a slab thickness that varies (e.g., between regions 891, 892, 893), with the average thickness of the primary fill 891 (e.g., $T_1$ of FIG. 4) generally thicker than the average thickness of the veins 892, 893 (e.g., $T_2$ of FIG. 4). In some embodiments, the exposed surface can resemble the appearance of a topographical or relief map of a plain with valleys running through it.

In some example embodiments, the primary fill 891 is softer or less abrasion-resistant than the veins 892, 893, the areas of the major surface 832 exposed at the major surface 832 may recede below bumps and mounds made up of the veins 892, 893. For example, the exposed surface can resemble the appearance of a topographical or relief map of a plain with hills or mountain ranges rising from it.

In some example embodiments, the vein 892 is softer than the primary fill 891, and the vein 893 is harder than the primary fill 891. The resulting texture of the major surface has features that are both raised (e.g., vein 893) and recessed (e.g., vein 893) relative to the average thickness. The processed major surface 852 has a texture that can be seen and/or felt due to the differences in average slab thicknesses in regions of the primary fill 891, the vein 892, and the vein 893.

In some embodiments, the processed stone slab product 850 produced by the example system 800 can be the example processed slabs 50, 350, 500, 600, of FIGS. 1-7. In some implementations, the processed stone slab product 850 may be further processed. For example, the major surface 852 may be polished to round or blunt sharp peaks, or the peaks may be polished or flattened to define flattened raised regions resembling plateaus.

In some example embodiments, the system 800 includes a calibration station arranged before or after the surface treatment station 840. For example, the major surfaces 832 of the cured slabs 830 can polished, planed, smoothed, and/or otherwise provided with a substantially even surface across the entire major surface 832 prior to being abraded. In another example, the processed major surfaces 852 of the cured slabs 830 can be partly polished, planed, smoothed, or otherwise modified to have a collection of plateaus that define a substantially common plane across the processed major surface 852. In some example embodiments, such steps may be omitted (e.g., the abrasion is performed on the major surface 832 in the form that exists after mold removal 797 without subjecting the slab to an intermediate planning or calibration operation).

Figure 9:
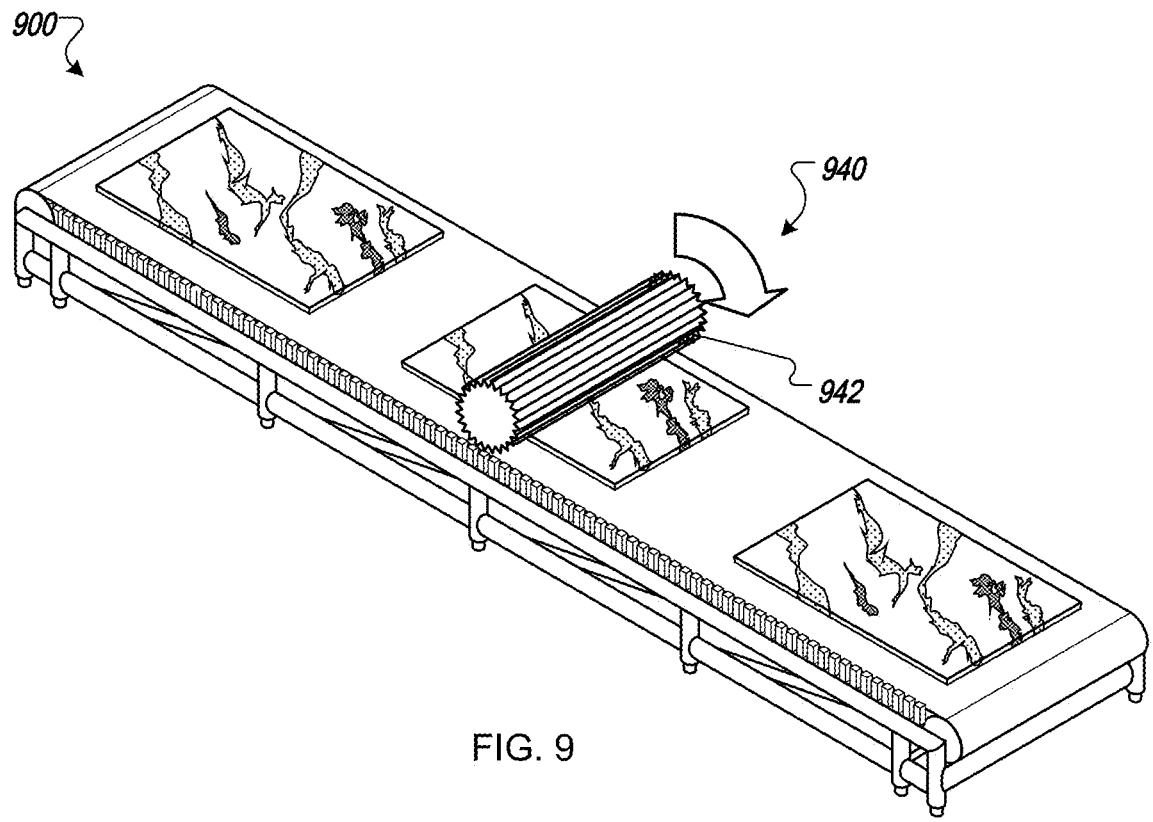
FIGS. 9 and 10 are diagrams of example systems for applying a surface treatment to texturize a processed slab product, in accordance with some embodiments.
Figure 10:
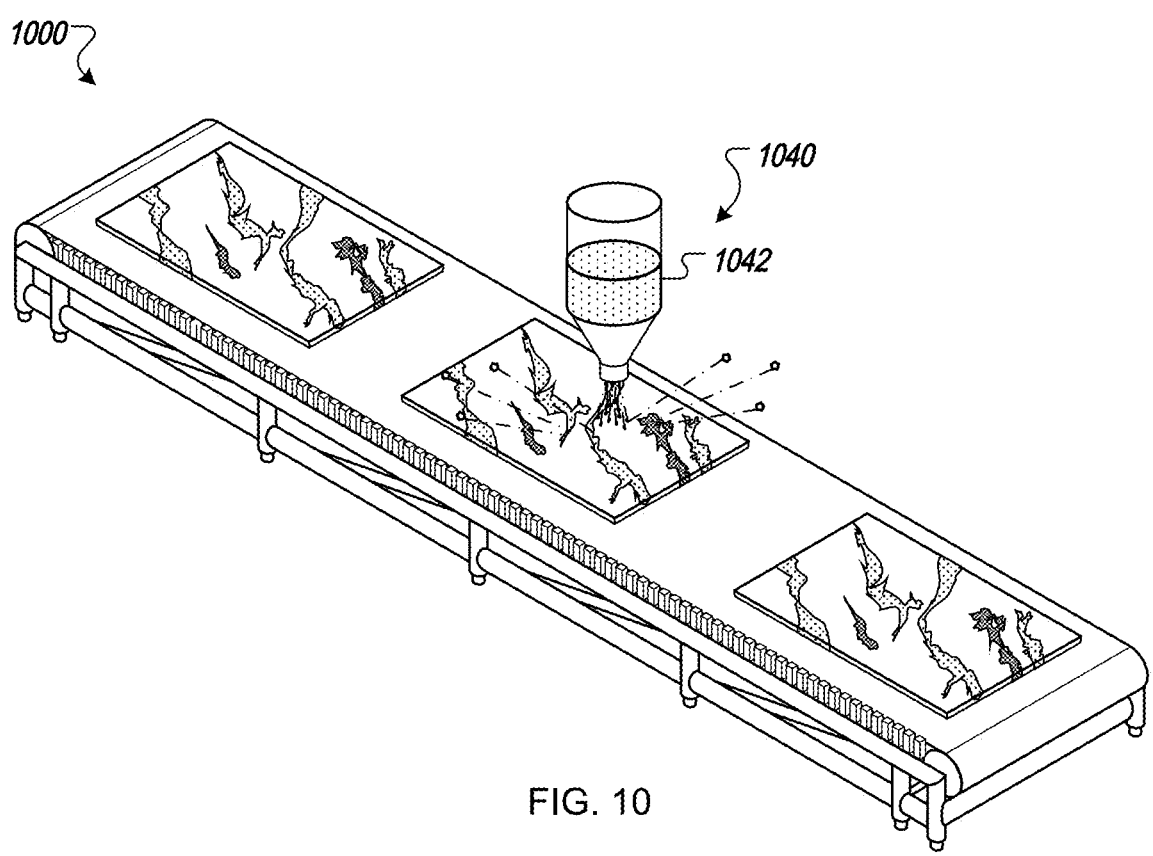

FIGS. 9-10 are diagrams of example systems 900 and 1000 for applying a surface treatment to texturize a processed slab product. In some embodiments, the systems 900 and 1000 are included in the example surface treatment station 798 (FIG. 7). In some example embodiments, the systems 900 and 1000 include one or more features of the example system 800 described with reference to FIG. 8.

Referring to FIG. 9, the system 900 includes a surface treatment station 940. The surface treatment station 940 includes one or more cylindrical abrasion tools 942. In some embodiments, the tool 942 is an abrasive brush that contacts the surface being processed and rotates substantially perpendicular to the surface about an axis that is substantially parallel to the surface. In some embodiments, the tool 942 can resemble a planning head configured to grind against the surface. The different materials in different areas of the surface abrade differently from each other due to the differences in their respective particulate mineral mixes, leaving behind a processed surface with a tactile and/or visual texture. In an example embodiment, the movement of the tool 942 across the major surface of the slab is independent of the region of the slab (e.g., independent of whether the brush is in contact with a particulate mineral mix), such that the tool 942 is consistently applied across the entire major surface of the slab.

Referring to FIG. 10, the system 1000 includes a surface treatment station 1040. The surface treatment station 1040 has a nozzle 1042 configured to perform abrasive blasting (e.g., sandblasting). In the illustrated example, a stream of abrasive material is forcibly propelled against the surface. The different materials in different areas of the surface abrade differently from each other due to the differences in their respective particulate mineral mixes, leaving behind a processed surface with a tactile and/or visual texture. In an example embodiment, application of the abrasive blasting across the major surface of the slab is independent of the region of the slab, such that the abrasive blasting is consistently applied across the entire major surface of the slab.

In some embodiments, the example systems 900-1000 may also use an abrasion promoter, such as an abrasive liquid or paste. In some embodiments, surface treatment stations may use a substantially non-abrasive brush or pad in combination with a paste, powder, or liquid that provides the abrasive properties. In some embodiments, surface treatment stations may use chemical etching, such as an acid or solvent for which the different materials in the slab react differently, to chemically etch the major surfaces of hardened and cured slabs. In some embodiments, surface treatment stations may use any appropriate combinations of the described tools, or any other appropriate tool or substance that can be used to abrade or erode the surface of a hardened and cured processed stone slab.

In some embodiments, the example systems 900-1000 may be configured with one or multiple stages of abrasion using one or multiple different types of abrasives, abrasion tools, abrasion patterns (e.g., the abrasion tool can be draw across the surface in predetermined straight lines, curves, circles), application pressures, grits, speeds, directions across the major surfaces, speeds across the major surfaces, any combination of these and/or other appropriate variables that can affect the abrasion of processed stone slabs.

Figure 11:
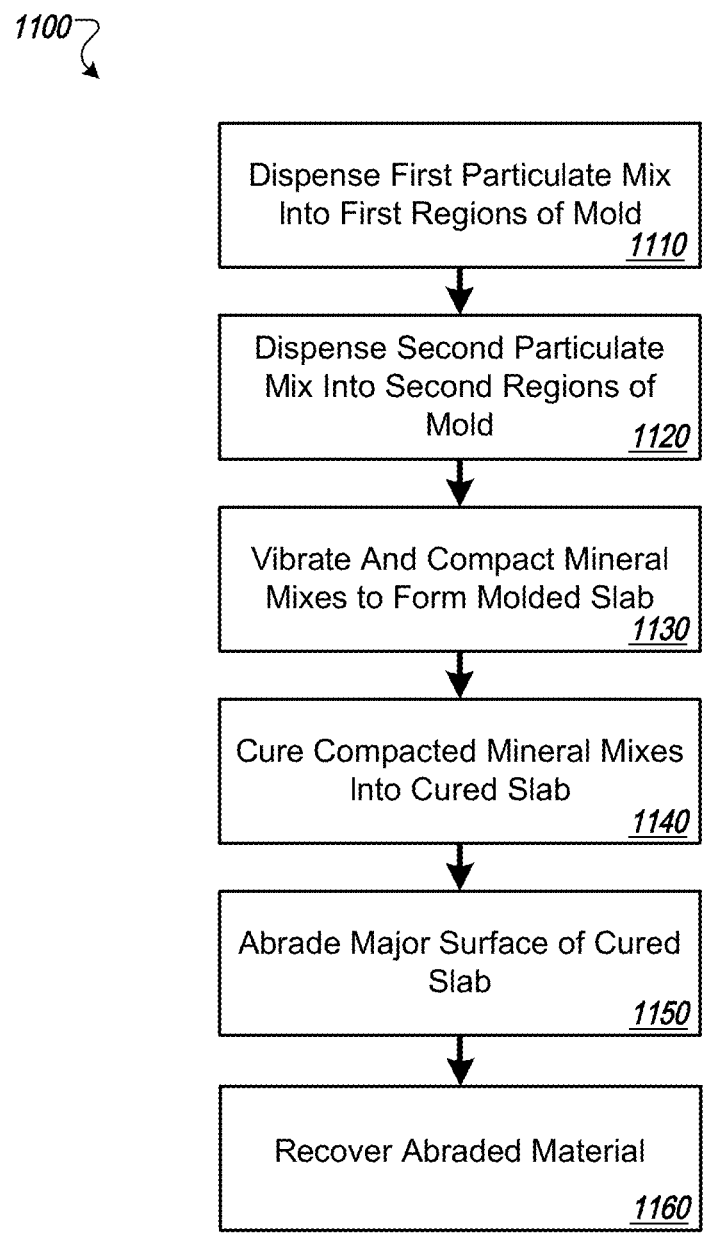
FIG. 11 is a flow diagram of an example process for producing a processed slab product, in accordance with some embodiments.

FIG. 11 is a flow diagram of an example process 1100 for producing a processed slab product from a plurality of different particulate mineral mixes. In some embodiments, the process 1100 is performed by parts or all of the example systems 700-1000 described with reference to FIGS. 7-10.

At 1110 a first particulate mineral mix is dispensed into a first set of regions of a slab mold. For example, a first particulate mineral mix is deposited into the slab mold to become one or more veins.

At 1120, a second particulate mineral mix is dispensed into a second set of regions of the slab mold. For example, the dispenser dispenses primary fill into the slab mold.

At 1130, the first particulate mineral mix and the second particulate mineral mix arranged in the slab mold are contemporaneously vibrated and compacted so as to form a molded slab that is generally rectangular and has a slab thickness and a major surface having a width of at least 2 feet and a length of at least 6 feet. For example a vibrio-compaction press applies compaction pressure, vibration, and/or vacuum to the contents inside the filled mold, thereby converting the particulate mixes into a rigid slab.

At 1140, the compacted first particulate mineral mix and the compacted second particulate mineral mix are cured into a cured slab. For example, the curing station heats or otherwise cures the compacted slabs to further strengthen the slabs inside the filled molds.

In some implementation, the first particulate mineral mix can include one or more first component materials having a first hardness, and the first particulate mineral mix can include one or more first component materials having a second hardness different from the first hardness. For example, the primary fill may be made up of a relatively hard particulate mineral mix and a resin binder that cures relatively hard, whereas the veins may be made up of a relatively hard particulate mineral mix and a resin binder that is somewhat softer (e.g., allowing the binder to erode away to expose more hard particulate, possibly resulting in a surface like sandstone or fine sandpaper). In some embodiments, the particulate mineral mix composition results in particulates with rounded facets and a microscopically bumpy surface.

At 1150, the major surface of the cured slab is abraded at locations of the first particulate mineral mix and the second particulate mineral mix with an abrading head to partly remove portions of the major surface such that the first particulate mineral mix in the first set of regions define a first thickness perpendicular to the slab width and the slab length, and the second particulate mineral mix in the second set of regions define a second thickness perpendicular to the slab width and the slab length. For example, the surface treatment stations 840, 940, and/or 1040 can be used to abrade the major surface, and due to the differences (e.g., hardness, abrasion resistance) among regions of the primary fill and the veins, the various regions abrade or erode to different depths resulting in the primary fill and the veins having different thicknesses across the major surface 832 (e.g., the difference between $T_1$ and $T_2$ in FIG. 4).

In some embodiments, example process 1100 optionally includes a material recovery operation 1160. Abraded material removed from the slab is recovered and treated. For example, abraded material is subjected to a separation process that separates material particles based on density, specific gravity, and/or other characteristics. The abraded material is passed through one or more centrifuge processes until the abraded material is segregated into individual material compositions or types. In some embodiments, the segregated material is recycled for reuse in a particulate mineral mix to be used in forming a finished slab. For example, metal particulate (e.g., stainless steel, brass, etc.) recovered from the abraded material is incorporated into a particulate mineral mix for subsequent formation of a different slab (e.g., incorporated into a particulate mineral mix that defines region 51, 52, 53, etc., described above). In this way, a finished slab can include one or more regions defined partly or entirely of material recovered/recycled from a previous molded slab.

In some embodiments, abrading a portion of the major surface of the cured slab includes removing an amount of the major surface in the first set of regions to an average first thickness perpendicular to the slab width and the slab length that is at least partly different from a second average thickness removed from the second set of regions, wherein the first texture is based on the first average thickness and the second texture is based on the second average thickness. For example, the primary fill abrades to average thickness $T_1$ while the veins abrade to average thickness $T_2$, less than $T_1$.

In some embodiments, one of the first set of regions and the second set of regions can define a majority of the major surface, and the other of the first set of regions and the second set of regions can define a vein extending at least partly across the major surface. For example, the primary fill 351 occupies a first set of regions within the slab 350, and other particulate mineral mixes form the veins 352 and 353, which extend partly or entirely across the surfaces and edges of the slab 350.

In some implementations, abrading the major surface of the cured slab includes abrading substantially the entire major surface. For example, the system 800 can be configured to apply the same type of abrasion across the entire major surface 832 (e.g., causing substantially all of the primary fill 891 exposed at the major surface 832 to erode to substantially the same average depth, and causing the veins 892 and 893 to each erode to their own respective average depths across the entire major surface 832).

In some implementations, abrading the major surface of the cured slab can include abrading by at least one of an abrasive brush and mechanical application of an abrasive fluid compound. For example, the example abrasive brushes 842 can be used to apply a fluid compound containing abrasive material to the major surface 832.

In some implementations, the first set of regions can have a first texture and the second set of regions can have a second texture different from the first texture. For example, the primary fill 351 may have a smooth, glossy texture, while the vein 352 may have a relatively rougher, matte texture. In some embodiments, the roughness of the vein 352 may be quantified by Ra, Rq, and Rz values.

In some implementations, the first texture can be defined by one or more of a first roughness, a first gloss, and a first average thickness that extends perpendicular to the slab width and the slab length, and the second texture can be defined by one or more of a second roughness, a second gloss, and a second average thickness that extends perpendicular to the slab width and the slab length. For example, the primary fill 351 and the veins 352, 353 can each be made up of mineral particulate mixes that each have particles that are more rounded or more faceted in shape, or have particulates or binders that have relatively different in terms of light absorption and reflectivity, or exhibit relatively different levels of receptivity to polishing. For example, the particulate mineral mixes that make up primary fill 351, 352, and/or 353 can be different particulate mineral mixes, such as particulate mineral mixes that are predominately quartz and particulate mineral mixes that are predominately metal. In another example, as described above, the texture can be defined by some areas having different thicknesses than others (e.g., the example veins 352, 353 have an example thickness of $T_2$ whereas the example primary fill has an example thickness of $T_1$, resulting in boundaries where the transitions between the different thicknesses can be felt or seen).

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A processed slab formed from a plurality of particulate mineral mixes, comprising:
 a slab width that is at least 2 feet;
 a slab length that extends perpendicular to the slab width and that is at least 6 feet, the slab length and the slab width defining a top major surface;
 a slab thickness that extends perpendicular to the slab width and the slab length, the slab length greater than the slab width, the slab width greater than the slab thickness; and
 a first pattern defined by a first particulate mix, the first pattern exposed along the top major surface of the slab, and the first particulate mix comprising first metallic particles having a first mesh size;
 a second pattern defined by a second particulate mix;
 wherein the first pattern defines at least one vein having a first measured gloss at 60 degrees of 75 or greater; and
 wherein the second pattern defines at least one region having a second measured gloss at 60 degrees that is different than the first measured gloss.

2. The processed slab of claim 1, the first particulate mix further comprising second metallic particles having a second mesh size different than the first mesh size wherein the first metallic particles make up greater than 10% by weight of the first particulate mix.

3. The processed slab of claim 2, wherein the second metallic particles make up greater than 40% by weight of the first particulate mix.

4. The processed slab of claim 1, wherein the first metallic particles are between 140 US mesh and 400 US mesh.

5. The processed slab of claim 2, wherein the second metallic particles makes up greater than 10% of the overall weight percent of the processed slab.

6. The processed slab of claim 2, wherein the first metallic particles and the second metallic particles are a same material.

7. The processed slab of claim 6, wherein the first metallic particles and the second metallic particles are stainless steel.

8. The processed slab of claim 6, wherein the first metallic particles and the second metallic particles are selected from the group consisting of copper, brass, nickel, and aluminum.

9. The processed slab of claim 1, wherein the first pattern exhibits an average gloss value greater than 80 and an average reflectance greater than 15.

10. The processed slab of claim 1, wherein the first particulate mix comprises greater than 30 weight percent of first metallic particles.

11. A processed slab formed from a plurality of particulate mineral mixes, comprising:
 a slab width that is at least 2 feet;
 a slab length that extends perpendicular to the slab width and that is at least 6 feet, the slab length and the slab width defining a top major surface;
 a slab thickness that extends perpendicular to the slab width and the slab length, the slab length greater than the slab width, the slab width greater than the slab thickness; and
 a first pattern defined by a first particulate mix, the first pattern exposed along the top major surface of the slab, and the first particulate mix comprising greater than 30 weight percent of first metallic particles;
 a second pattern defined by a second particulate mix;
 wherein the first pattern corresponds to a first region exhibiting a first average reflectance haze, and the second pattern corresponds to a second region exhibiting a second average reflectance haze, and
 wherein the first average reflectance haze is greater than 10 and the second average reflectance haze is less than 8.

12. The processed slab of claim 11, wherein the first metallic particles are stainless steel particulate having a specified size between 50 US mesh and 140 US mesh.

13. The processed slab of claim 11, wherein the first metallic particles are selected from the group consisting of copper, brass, nickel, and aluminum.

14. The processed slab of claim 11, wherein the first pattern defines at least one vein having a measured graininess, $S\_G$, a measured sparkle index, $S\_i$, and a measured sparkle amount, $S\_a$, wherein the sum of $S\_G$, $S\_i$, and $S\_a$, is greater than 35.

15. The processed slab of claim 11, wherein the first pattern defines at least one vein having a measured gloss at 60 degrees of 75 or greater.

16. The processed slab of claim 1, wherein the first pattern corresponds to a first region exhibiting a first average reflectance haze, and the second pattern corresponds to a second region exhibiting a second average reflectance haze, and wherein the first average reflectance haze is different than the second average reflectance haze.

17. The processed slab of claim 11, wherein the overall weight percentage of metal of the finished slab is greater than 2 wt %.

18. The processed slab of claim 11, wherein the first particulate mix comprises greater than 10% by weight of the first metallic particles.

* * * * *